US012451608B2

(12) United States Patent
Dave et al.

(10) Patent No.: US 12,451,608 B2
(45) Date of Patent: Oct. 21, 2025

(54) DUAL POLARIZED BASE STATION AND USER EQUIPMENT ANTENNA FOR UPPER MID-BAND X-MIMO

(71) Applicant: Samsung Electronics Co., Ltd., Suwon-si (KR)

(72) Inventors: Aditya Dave, Plano, TX (US); Jiantong Li, McKinney, TX (US); Alireza Foroozesh, Los Angeles, CA (US); Won Suk Choi, McKinney, TX (US); Gang Xu, Allen, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 95 days.

(21) Appl. No.: 18/419,306

(22) Filed: Jan. 22, 2024

(65) Prior Publication Data

US 2024/0258701 A1 Aug. 1, 2024

Related U.S. Application Data

(60) Provisional application No. 63/442,009, filed on Jan. 30, 2023.

(51) Int. Cl.
*H01Q 9/04* (2006.01)
*H01Q 21/06* (2006.01)

(52) U.S. Cl.
CPC ........... *H01Q 9/0464* (2013.01); *H01Q 9/045* (2013.01); *H01Q 21/065* (2013.01)

(58) Field of Classification Search
CPC ..... H01Q 9/0464; H01Q 9/045; H01Q 21/065
See application file for complete search history.

(56) References Cited

U.S. PATENT DOCUMENTS 6,091,365 A 7/2000 Derneryd et al.
6,147,648 A 11/2000 Granholm et al.
(Continued)

FOREIGN PATENT DOCUMENTS

CN 105633564 B 1/2019
CN 112993557 A 6/2021
(Continued)

OTHER PUBLICATIONS

International Search Report and Written Opinion issued Apr. 24, 2024 regarding International Application No. PCT/KR2024/001183, 6 pages.
(Continued)

*Primary Examiner* — Graham P Smith

(57) ABSTRACT

An apparatus includes a substrate and a plurality of antenna elements on the substrate and arranged according to an antenna configuration. The antenna configuration includes a rectangular antenna patch, and first and second pairs of circular antenna patches. The first pair of circular antenna patches supports a first angular polarization, wherein the circular antenna patches of the first pair are coupled to opposite corners of the rectangular antenna patch. The second pair of circular antenna patches supports a second angular polarization that is orthogonal to the first angular polarization, wherein the antenna patches of the second pair are coupled to opposite corners of the rectangular antenna patch, wherein each of the antenna patches of the first pair are positioned on corners adjacent to both of the antenna patches of the second pair.

20 Claims, 18 Drawing Sheets

Metal Layer 1

(56) References Cited

U.S. PATENT DOCUMENTS

| | | | |
|---|---|---|---|
| 10,135,133 | B2 | 11/2018 | Wu et al. |
| 2011/0025571 | A1 | 2/2011 | Adada et al. |
| 2019/0267710 | A1 | 8/2019 | Jenwatanavet et al. |
| 2021/0013634 | A1 | 1/2021 | Lin |

FOREIGN PATENT DOCUMENTS

| | | | |
|---|---|---|---|
| CN | 213660635 | U | 7/2021 |
| CN | 113889771 | B | 3/2023 |

OTHER PUBLICATIONS

Samsung, "6G Spectrum Expanding the Frontier", Samsung Research, May 2022, 25 pages. https://cdn.codeground.org/nsr/downloads/researchareas/2022May_6G_Spectrum.pdf.

700

600

DUAL POLARIZED BASE STATION AND USER EQUIPMENT ANTENNA FOR UPPER MID-BAND X-MIMO

CROSS-REFERENCE TO RELATED APPLICATION AND PRIORITY CLAIM

This application claims priority under 35 U.S.C. § 119(e) to U.S. Provisional Patent Application No. 63/442,009 filed on Jan. 30, 2023, which is hereby incorporated by reference in its entirety.

TECHNICAL FIELD

This disclosure relates generally to multiple-input multiple-output (MIMO) antenna array devices and processes. More specifically, this disclosure relates to a dual polarized base station and user equipment (UE) antenna for 6G upper mid-band cross-division duplex (XDD) MIMO (X-MIMO) application.

BACKGROUND

MIMO is a technology that helps in increasing reliability and throughput. X-MIMO combines multiple-user MIMO and massive MIMO to enable higher coverage and increased capacity for multiple users at the same time.

SUMMARY

This disclosure provides a dual polarized base station and UE antenna for 6G upper mid-band X-MIMO application.

In a first embodiment, an apparatus includes a substrate and a plurality of antenna elements on the substrate and arranged according to an antenna configuration. The antenna configuration includes a rectangular antenna patch, and first and second pairs of circular antenna patches. The first pair of circular antenna patches supports a first angular polarization, wherein the circular antenna patches of the first pair are coupled to opposite corners of the rectangular antenna patch. The second pair of circular antenna patches supports a second angular polarization that is orthogonal to the first angular polarization, wherein the antenna patches of the second pair are coupled to opposite corners of the rectangular antenna patch, wherein each of the antenna patches of the first pair are positioned on corners adjacent to both of the antenna patches of the second pair.

In a second embodiment, an electronic device includes a multiple input multiple output (MIMO) antenna, transit (TX) processing circuitry, and receive (RX) processing circuitry. The MIMO antenna includes a substrate and a plurality of antenna elements on the substrate and are arranged according to an antenna configuration. The antenna configuration includes a rectangular antenna patch, and first and second pairs of circular antenna patches. The first pair of circular antenna patches supports a first angular polarization, wherein the circular antenna patches of the first pair are coupled to opposite corners of the rectangular antenna patch. The second pair of circular antenna patches supports a second angular polarization that is orthogonal to the first angular polarization, wherein the antenna patches of the second pair are coupled to opposite corners of the rectangular antenna patch, wherein each of the antenna patches of the first pair are positioned on corners adjacent to both of the antenna patches of the second pair. The TX processing circuitry is coupled to the plurality of antenna elements and configured to provide signals to the plurality of antenna elements. The RX processing circuitry is coupled to the plurality of antenna elements and configured to receive signals from the plurality of antenna elements, wherein each of the antenna patches of the first pair are positioned on corners adjacent to both of the antenna patches of the second pair.

In a third embodiment, a method includes providing signals to a plurality of antenna elements including a rectangular antenna patch, a first pair of circular antenna patches supporting a first angular polarization, and a second pair of circular antenna patches supporting a second angular polarization that is orthogonal to the first angular polarization. The method also includes receiving signals from the plurality of antenna elements. The method further includes increasing port-to-port isolation for antennas in the plurality of antennas using an antenna configuration comprising the circular antenna patches of the first pair coupled to opposite corners of the rectangular antenna patch and the antenna patches of the second pair coupled to opposite corners of the rectangular antenna patch, wherein each of the antenna patches of the first pair are positioned on corners adjacent to both of the antenna patches of the second pair.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term “couple” and its derivatives refer to any direct or indirect communication between two or more elements, whether or not those elements are in physical contact with one another. The terms “transmit,” “receive,” and “communicate,” as well as derivatives thereof, encompass both direct and indirect communication. The terms “include” and “comprise,” as well as derivatives thereof, mean inclusion without limitation. The term “or” is inclusive, meaning and/or. The phrase “associated with,” as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term “controller” means any device, system, or part thereof that controls at least one operation. Such a controller may be implemented in hardware or a combination of hardware and software and/or firmware. The functionality associated with any particular controller may be centralized or distributed, whether locally or remotely. The phrase “at least one of,” when used with a list of items, means that different combinations of one or more of the listed items may be used, and only one item in the list may be needed. For example, “at least one of: A, B, and C” includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms “application” and “program” refer to one or more computer programs, software components, sets of instructions, procedures, functions, objects, classes, instances, related data, or a portion thereof adapted for implementation in a suitable computer readable program code. The phrase “computer readable program code” includes any type of computer code, including source code, object code, and executable code. The phrase “computer readable medium” includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
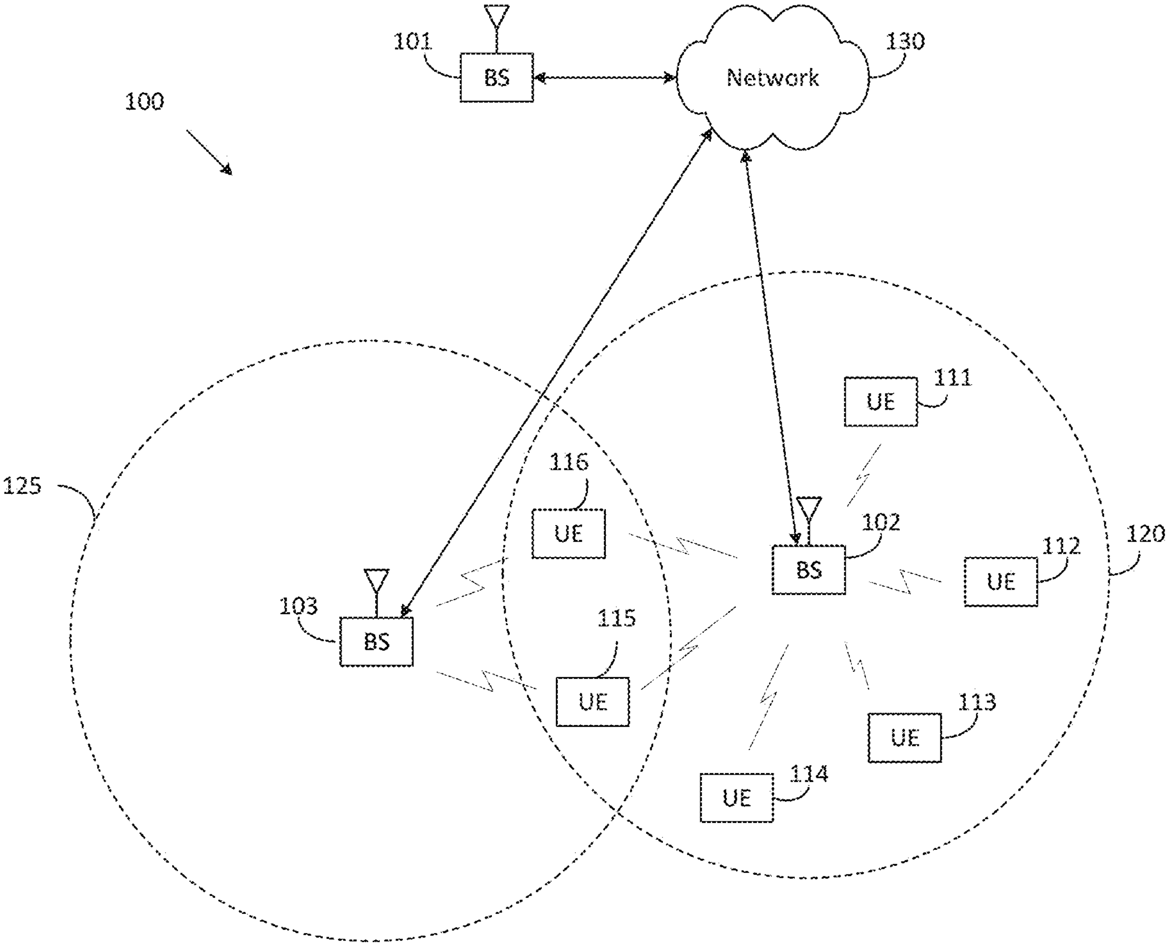
FIG. 1 illustrates an example communication system in accordance with an embodiment of this disclosure.

FIGS. 1 through 23, described below, and the various embodiments used to describe the principles of the present disclosure are by way of illustration only and should not be construed in any way to limit the scope of the disclosure. Those skilled in the art will understand that the principles of the present disclosure may be implemented in any type of suitably arranged device or system.

Deployment and analysis of current 5G networks have indicated that although the sub-6 GHz band offers lower bandwidth and throughput than mm-Wave bands, it has better overall performance. Citing these reasons, an upper mid-band from 7 GHz-24 GHz is proposed for 6G to provide excellent capacity with reasonable coverage.

X-MIMO systems can use cross-division duplex (XDD) with 1024 antennas at 45°/135° dual polarization to generate 16 simultaneous beams with 120° scan angle for each beam. This means that 64 out of the 1024 antennas and their associated radio frequency integrated circuits (RFICs) control generation and steering of one beam.

While the full system development is out of the current scope, 8×8 antenna array operating at 13 GHz can be tested with commercially available evaluation boards. The novel antenna element and array development is driven by three performance factors including (1) less than-20 dB mutual coupling, (2) greater than 20 dB cross-pol isolation in realized gain, and (3) low cost printed circuit board (PCB) fabrication. The first two conditions are necessary for optimal X-MIMO performance. The low manufacturing cost is necessary for commercialization.

There are certain specifications related to general MIMO applications and this X-MIMO application operating in the upper mid-band at 13 GHz for future 6G applications. The following should be met for optimal performance and easy commercialization. (1) Dual polarized antenna elements with 45°/135° polarization operating at 13 GHz in the upper mid-band. (2) Wideband antenna to cover a band of 500 MHz or more around the center design frequency. (3) For greater than 1000 antennas, antenna sub-arrays at various sizes to reduce a number of power amplifiers and RFICs. (4) Antennas fabricated in such a way that the cost is minimized, so that the product is easily commercializable. (5) 2 polarizations in the antenna element or the sub-arrays have low mutual coupling of less than-20 dB. (6) There is more than 20 dB isolation between the two polarizations when they radiate in far-field out of the antenna.

To address the aforementioned challenges, the X-MIMO antenna panel aims at 8% S11 bandwidth around 13 GHz, wide gain bandwidth, wide scanning range, low PCB fabrication cost, low mutual coupling, and high cross-pol isolation.

Figure 2:
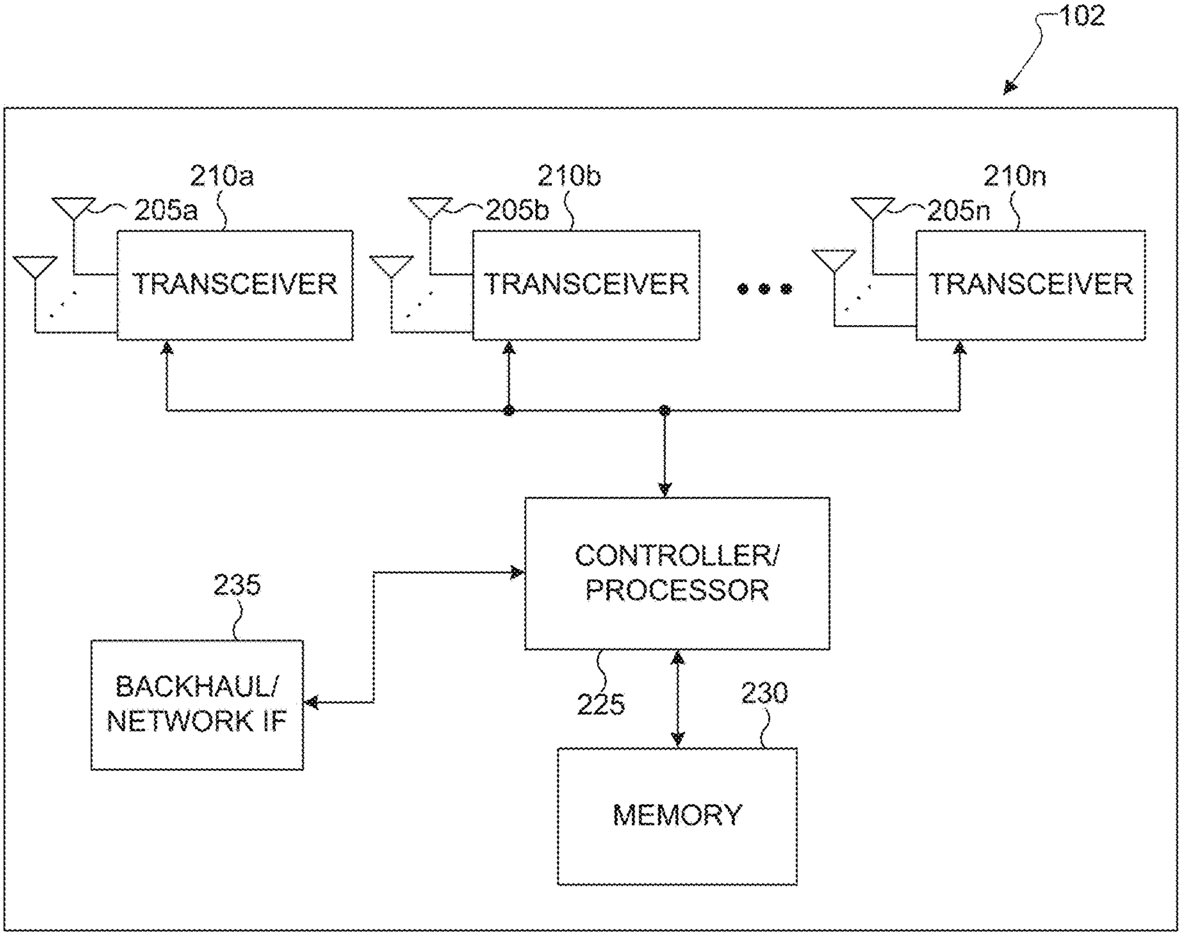
FIGS. 2 and 3 illustrate example electronic devices in accordance with an embodiment of this disclosure.
Figure 3:
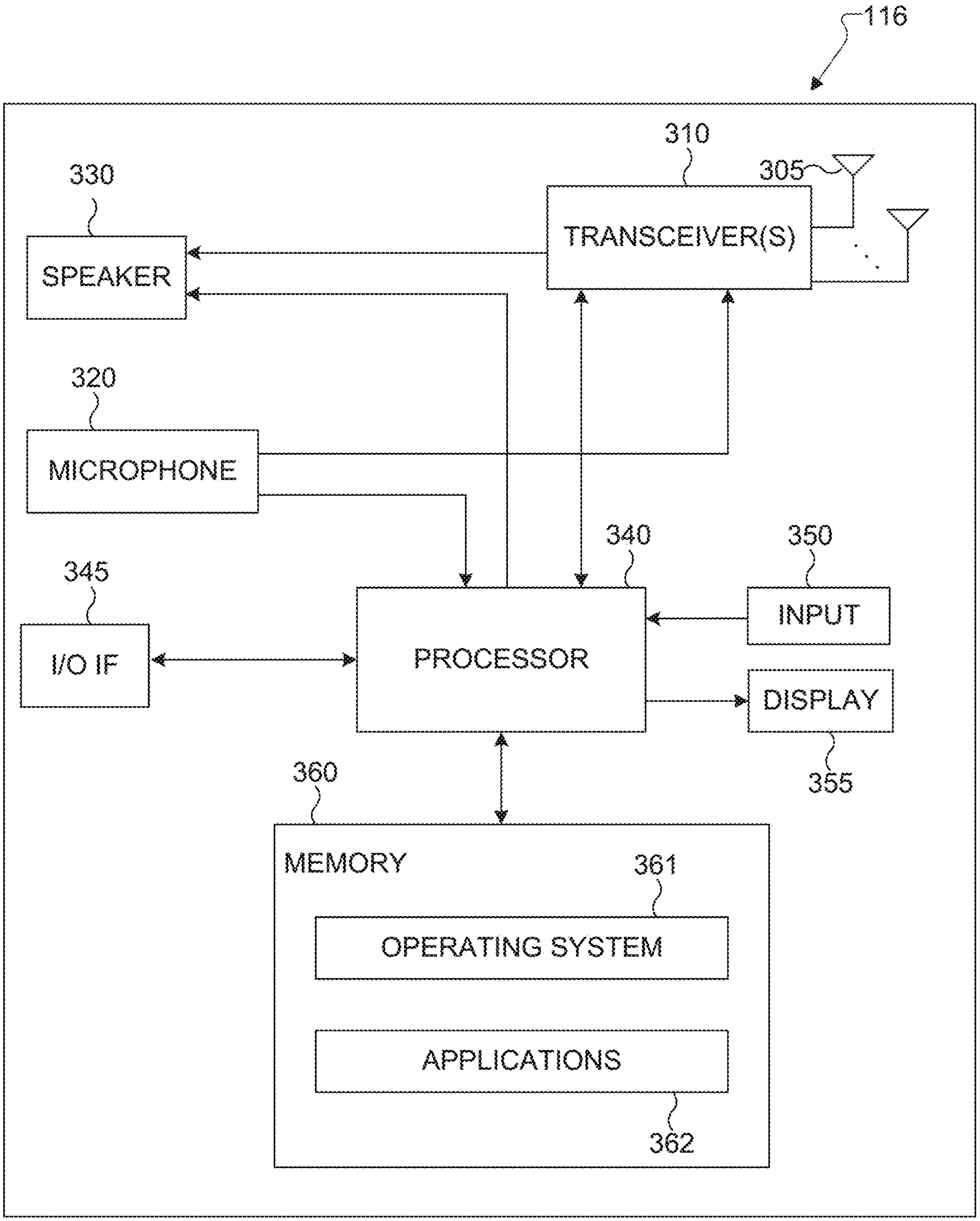

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101 (e.g., base station, BS), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise; a UE 113, which may be a WiFi hotspot; a UE 114, which may be located in a first residence; a UE 115, which may be located in a second residence; and a UE 116, which may be a mobile device, such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G/NR, long term evolution (LTE), long term evolution-advanced (LTE-A), WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR 3$^{rd}$ generation partnership project (3GPP) NR, long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas **205*a*-205*n*, multiple transceivers 210*a*-210*n*, a controller/processor 225, a memory 230, and a backhaul or network interface 235**.

The transceivers **210*a*-210*n* receive, from the antennas 205*a*-205*n*, incoming RF signals, such as signals transmitted by UEs in the network 100. The transceivers 210*a*-210*n* down-convert the incoming RF signals to generate IF or baseband signals. The IF or baseband signals are processed by receive (RX) processing circuitry in the transceivers 210*a*-210*n* and/or controller/processor 225, which generates processed baseband signals by filtering, decoding, and/or digitizing the baseband or IF signals. The controller/processor 225** may further process the baseband signals.

Transmit (TX) processing circuitry in the transceivers **210*a*-210*n* and/or controller/processor 225 receives analog or digital data (such as voice data, web data, e-mail, or interactive video game data) from the controller/processor 225. The TX processing circuitry encodes, multiplexes, and/or digitizes the outgoing baseband data to generate processed baseband or IF signals. The transceivers 210*a*-210*n* up-convert the baseband or IF signals to RF signals that are transmitted via the antennas 205*a*-205*n***.

The controller/processor 225 can include one or more processors or other processing devices that control the overall operation of the gNB 102. For example, the controller/processor 225 could control the reception of UL channel signals and the transmission of DL channel signals by the transceivers **210*a*-210*n* in accordance with well-known principles. The controller/processor 225 could support additional functions as well, such as more advanced wireless communication functions. For instance, the controller/processor 225 could support beam forming or directional routing operations in which outgoing/incoming signals from/to multiple antennas 205*a*-205*n* are weighted differently to effectively steer the outgoing signals in a desired direction. Any of a wide variety of other functions could be supported in the gNB 102 by the controller/processor 225**.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G/NR, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes antenna(s) 305, a transceiver(s) 310, and a microphone 320. The UE 116 also includes a speaker 330, a processor 340, an input/output (I/O) interface (IF) 345, an input 350, a display 355, and a memory 360. The memory 360 includes an operating system (OS) 361 and one or more applications 362.

The transceiver(s) 310 receives, from the antenna 305, an incoming RF signal transmitted by a gNB of the network 100. The transceiver(s) 310 down-converts the incoming RF signal to generate an intermediate frequency (IF) or baseband signal. The IF or baseband signal is processed by RX processing circuitry in the transceiver(s) 310 and/or processor 340, which generates a processed baseband signal by filtering, decoding, and/or digitizing the baseband or IF signal. The RX processing circuitry sends the processed baseband signal to the speaker 330 (such as for voice data) or is processed by the processor 340 (such as for web browsing data).

TX processing circuitry in the transceiver(s) 310 and/or processor 340 receives analog or digital voice data from the microphone 320 or other outgoing baseband data (such as web data, e-mail, or interactive video game data) from the processor 340. The TX processing circuitry encodes, multiplexes, and/or digitizes the outgoing baseband data to generate a processed baseband or IF signal. The transceiver(s) 310 up-converts the baseband or IF signal to an RF signal that is transmitted via the antenna(s) 305.

The processor 340 can include one or more processors or other processing devices and execute the OS 361 stored in the memory 360 in order to control the overall operation of the UE 116. For example, the processor 340 could control the reception of DL channel signals and the transmission of UL channel signals by the transceiver(s) 310 in accordance with well-known principles. In some embodiments, the processor 340 includes at least one microprocessor or microcontroller.

The processor 340 is also capable of executing other processes and programs resident in the memory 360. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the input 350, which includes for example, a touchscreen, keypad, etc., and the display 355. The operator of the UE 116 can use the input 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random-access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). In another example, the transceiver(s) 310 may include any number of transceivers and signal processing chains and may be connected to any number of antennas. Also, while FIG. 3 illustrates the UE 116 configured as a mobile telephone or smartphone, UEs could be configured to operate as other types of mobile or stationary devices.

Figure 4:
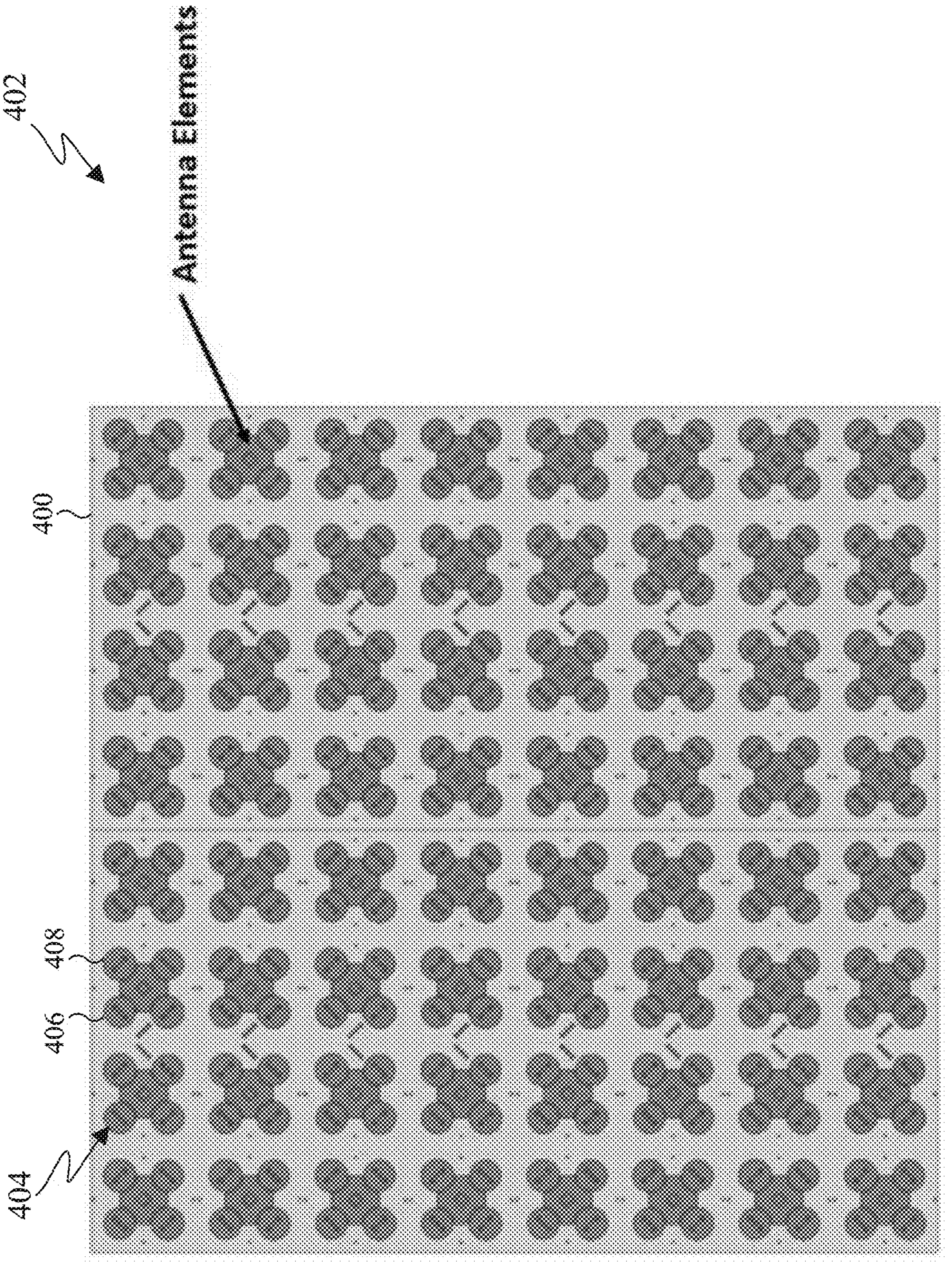
FIG. 4 illustrates a top view of an example antenna array in accordance with this disclosure.
Figure 5:
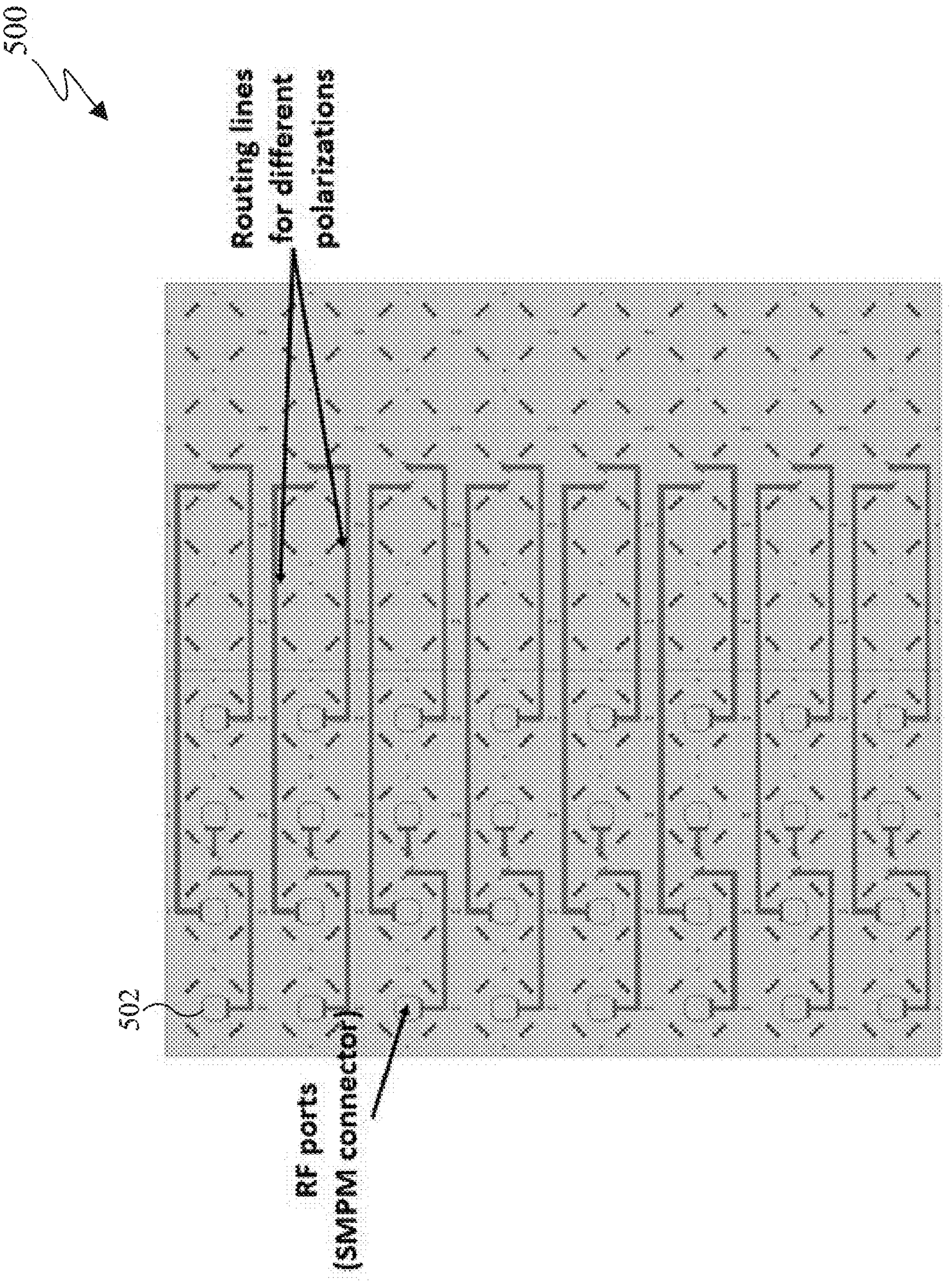
FIG. 5 illustrates a bottom view of an example antenna array in accordance with this disclosure.
Figure 7:
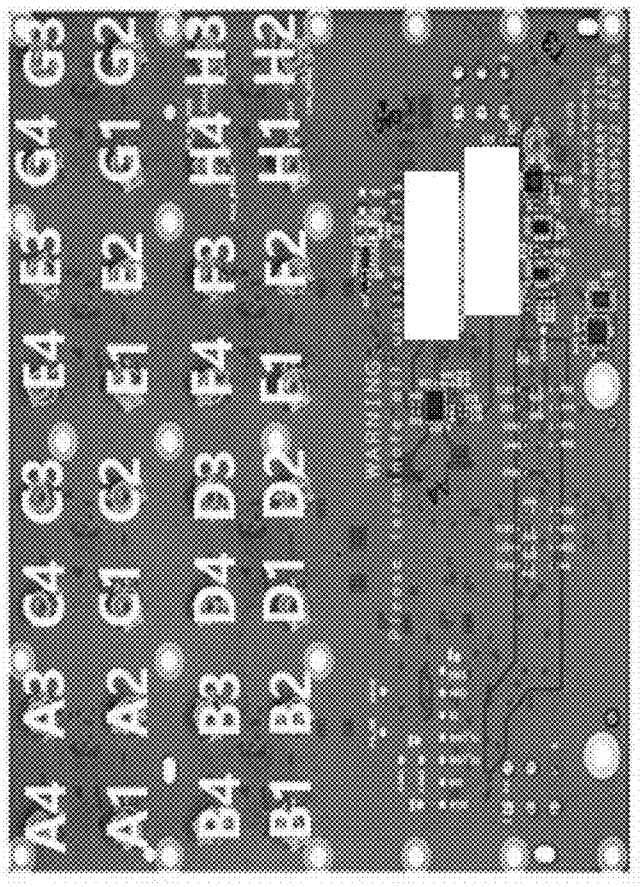
FIG. 7 illustrates an example antenna module in accordance with this disclosure.
Figure 6:
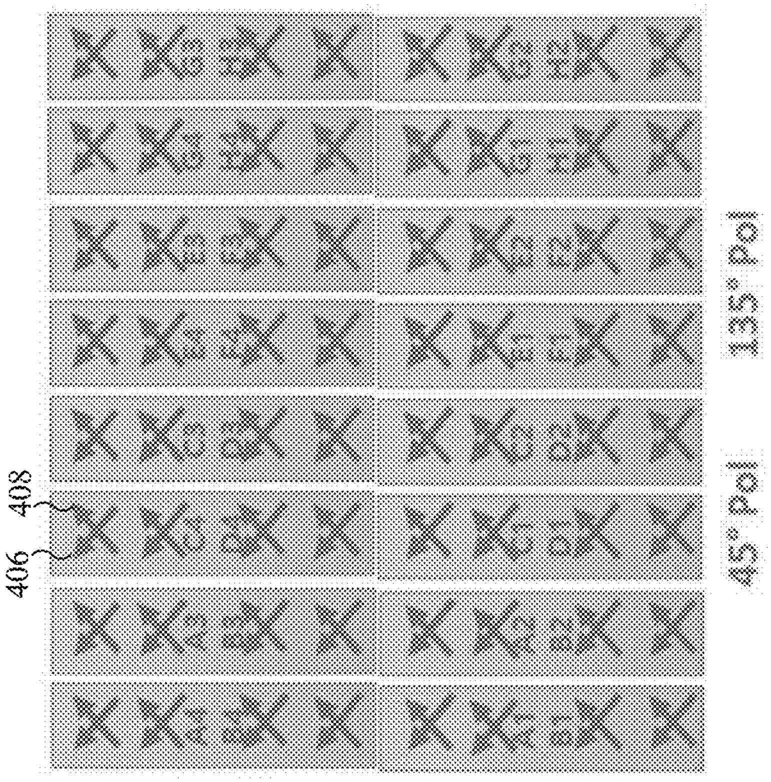
FIG. 6 illustrates an example antenna architecture with 45° polarized elements and 135° polarized elements in accordance with this disclosure.
Figure 8:
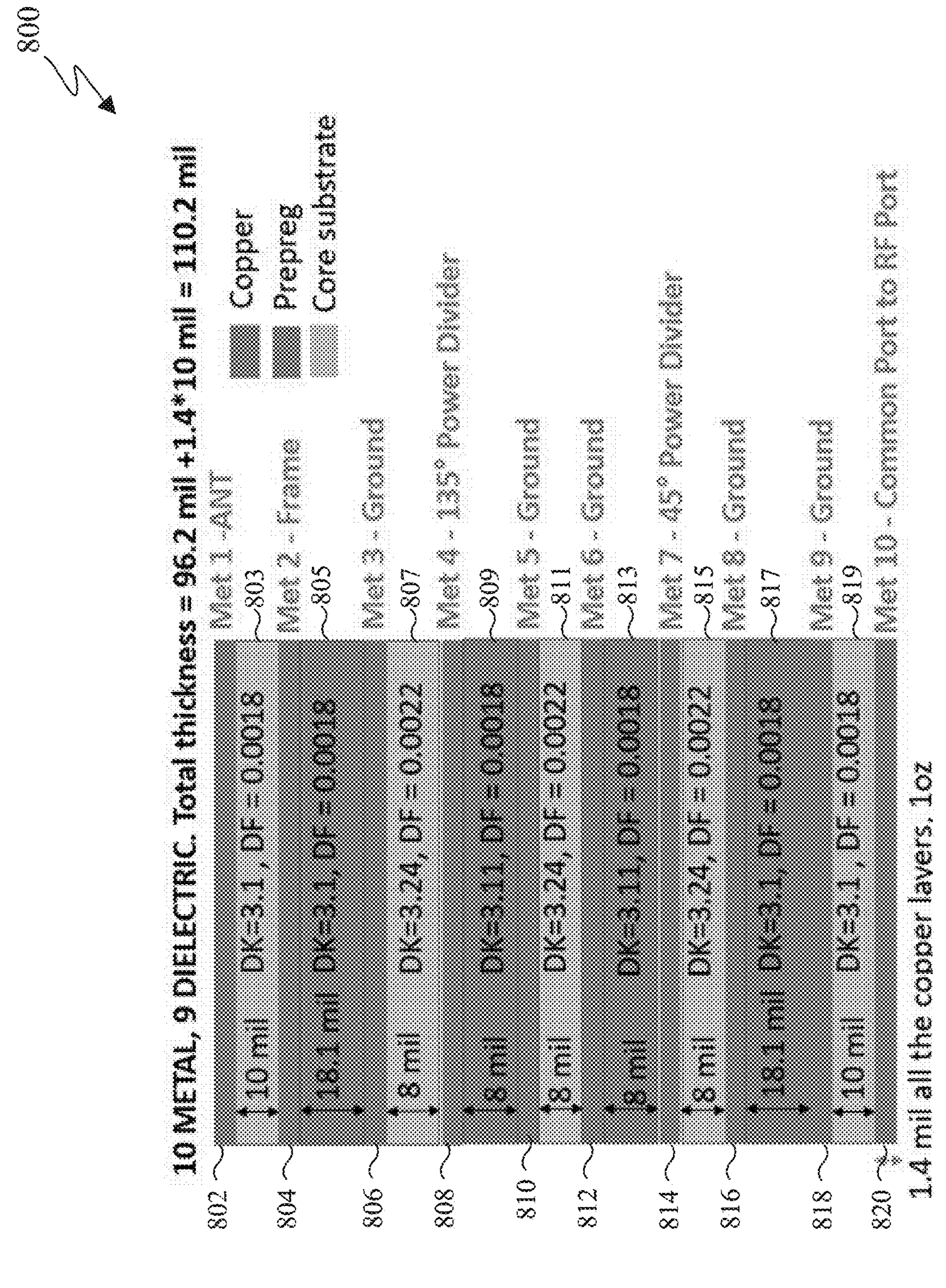
FIG. 8 illustrates an example antenna module stack-up in accordance with this disclosure.

FIGS. 4-8 illustrate an example antenna array in accordance with this disclosure. In particular, FIG. 4 illustrates a top view 400 of an example antenna array 402; FIG. 5 illustrates a bottom view 500 of an example antenna array 402; FIG. 6 illustrates an example antenna module 600 with 45° polarized elements and 135° polarized elements; FIG. 7 illustrates an example evaluation board 700; and FIG. 8 illustrates an example antenna module stack-up 800. The embodiment of the example antenna array 402 illustrated in FIGS. 4-8 is for illustration only. FIGS. 4-8 do not limit the scope of this disclosure to any particular implementation of an electronic device.

As shown in FIGS. 4 and 5, an example antenna array 402 includes 64 dual polarized antenna elements 404 on top view 400 and 32 RF ports 502 on the bottom view 500. Sixteen RF ports of the 32 RF ports are used to excite 45° polarization elements 406 and the other sixteen RF ports are used to excite 135° polarization elements 408.

The example antenna module stack-up 800 can be designed to accommodate a transition between evaluation board and antenna PCB and fitting a dual polarized antenna with associated sub-arrays and differential feedlines, all by maintaining low loss, and low mutual coupling between polarizations.

The example antenna array 402 can be designed to include differential feed dual polarized 45° polarization elements 406 and 135° polarization elements 408. This design of the example antenna array 402 results in increased gain, 3 dB gain bandwidth of greater than 11%, and S11 matching bandwidth of greater than 8%.

The feeding mechanism can provide high cross-polarization isolation. Using through vias results in lower PCB manufacturing cost. Use of impedance control vias results in maintaining good S11 bandwidth. Carefully design stub networks help in reducing via loss and bandwidth by compensating the additional via impedance.

As shown in FIGS. 6 and 7, the antenna module 600 can be placed over an evaluation board 700. For example, an 8×8 antenna module can be tested with a commercial evaluation board 700, such as ADAR1000EVAL1Z (Stingray) by Analog Devices Inc. The evaluation board 700 has eight radio-frequency integrated circuits (RFICs) A-H. The top four RFICs—A, C, E, and G, are used for 135° polarization elements 408. The bottom four RFICs—B, D, F, and H, are used for 45° polarization elements 406. Each RFIC has four channels, which means that there are sixteen available RF ports for each polarization. To use these sixteen ports to feed 64 antenna elements, it is necessary to use a 4×1 antenna sub-array as shown in the antenna architecture. Each element of this 4×1 subarray has two feed locations and can support dual 45° and 135° polarization.

As shown in FIG. 8, the antenna module stack-up 800 can include ten metal layers and nine dielectric layers. The multi-layer substrate can have an approximate thickness in a range from 0.01-0.02 of a free space wavelength ($\lambda_0$). The antenna module stack-up 800 can includes at least one of a transition layer, a 1×4 power divider layer of 135° polarization a 1×4 power divider layer of 45° polarization and an antenna layer. The antenna module stack-up 800 can be formed of the antenna element, differential feed lines for two polarizations, power divider for the 4×1 sub-array and the routing from the power divider common port to the RF port of the stingray board. This architecture necessitates a multiple-layer symmetric PCB design. Symmetricity can be utilized from a thermal perspective to prevent PCB warping after long time of heat exposures. Dielectric Isola Tachyon 100G with Dk=3.1 to 3.24 and Df=1.8e-3 to 2.2e-3 was chosen. DK and Df vary due to different fill factors for core and prepreg substrates.

In certain embodiments, the antenna module stack-up 800 can include ten metal layers and nine dielectric layers separating the ten metal layers. Each of the metal layer can have a thickness of approximately 1.4 mil and be made of 1 oz of copper. A first metal layer 802 can function as an antenna layer. A first dielectric layer 803 can separate the first metal layer 802 from a second metal layer 804. The first dielectric layer 803 can have a thickness of approximately 10 mil, a relative permittivity of approximately 3.1, and a dissipation factor of approximately 0.0018.

The second metal layer 804 can function as a frame. A second dielectric layer 805 can separate the second metal layer 804 from a third metal layer 806. The second dielectric layer 805 can have a thickness of approximately 18.1 mil, a relative permittivity of approximately 3.1, and a dissipation factor of approximately 0.0018.

The third metal layer 806 can function as a ground. A third dielectric layer 807 can separate the third metal layer 806 from a fourth metal layer 808. The third dielectric layer 807 can have a thickness of approximately 8 mil, a relative permittivity of approximately 3.24, and a dissipation factor of approximately 0.0022.

The fourth metal layer 808 can function as a 135° power divider. A fourth dielectric layer 809 can separate the fourth metal layer 808 from a fifth metal layer 810. The fourth dielectric layer 809 can have a thickness of approximately 8 mil, a relative permittivity of approximately 3.11, and a dissipation factor of approximately 0.0018.

The fifth metal layer 810 can function as a ground. A fifth dielectric layer 811 can separate the fifth metal layer 810 from a sixth metal layer 812. The fifth dielectric layer 811 can have a thickness of approximately 8 mil, a relative permittivity of approximately 3.24, and a dissipation factor of approximately 0.0022.

The sixth metal layer 812 can function as a ground. A sixth dielectric layer 813 can separate the sixth metal layer 812 from a seventh metal layer 814. The sixth dielectric layer 813 can have a thickness of approximately 8 mil, a relative permittivity of approximately 3.11, and a dissipation factor of approximately 0.0018.

The seventh metal layer 814 can function as a 45° polarization power divider. A seventh dielectric layer 815 can separate the seventh metal layer 814 from an eighth metal layer 816. The seventh dielectric layer 815 can have a thickness of approximately 8 mil, a relative permittivity of approximately 3.24, and a dissipation factor of approximately 0.0022.

The eighth metal layer 816 can function as a ground. An eighth dielectric layer 817 can separate the eighth metal layer 816 from a ninth metal layer 818. The eighth dielectric layer 817 can have a thickness of approximately 18.1 mil, a relative permittivity of approximately 3.1, and a dissipation factor of approximately 0.0018.

The ninth metal layer 818 can function as a ground. A ninth dielectric layer 819 can separate the ninth metal layer 818 from a tenth metal layer 820. The ninth dielectric layer 819 can have a thickness of approximately 10 mil, a relative permittivity of approximately 3.1, and a dissipation factor of approximately 0.0018. The tenth metal layer 820 can function as a common port to RF port.

Although FIGS. 4-8 illustrate an example antenna array 402, various changes may be made to FIGS. 4-8. For example, the sizes, shapes, and dimensions of the example antenna array 402 and its individual components can vary as needed or desired. Also, the number and placement of various components of the example antenna array 402 can vary as needed or desired. In addition, the example antenna array 402 may be used in any other suitable communication process and is not limited to the specific processes described above.

Figure 10:
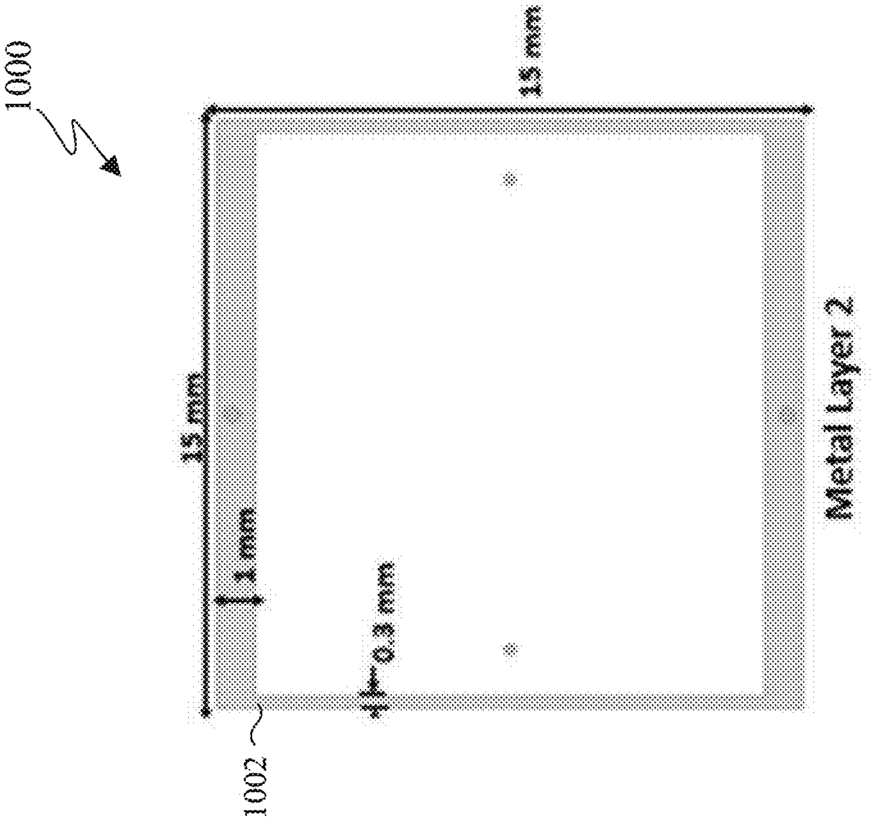
FIG. 10 illustrates an example second layer of an antenna element in accordance with this disclosure.
Figure 9:
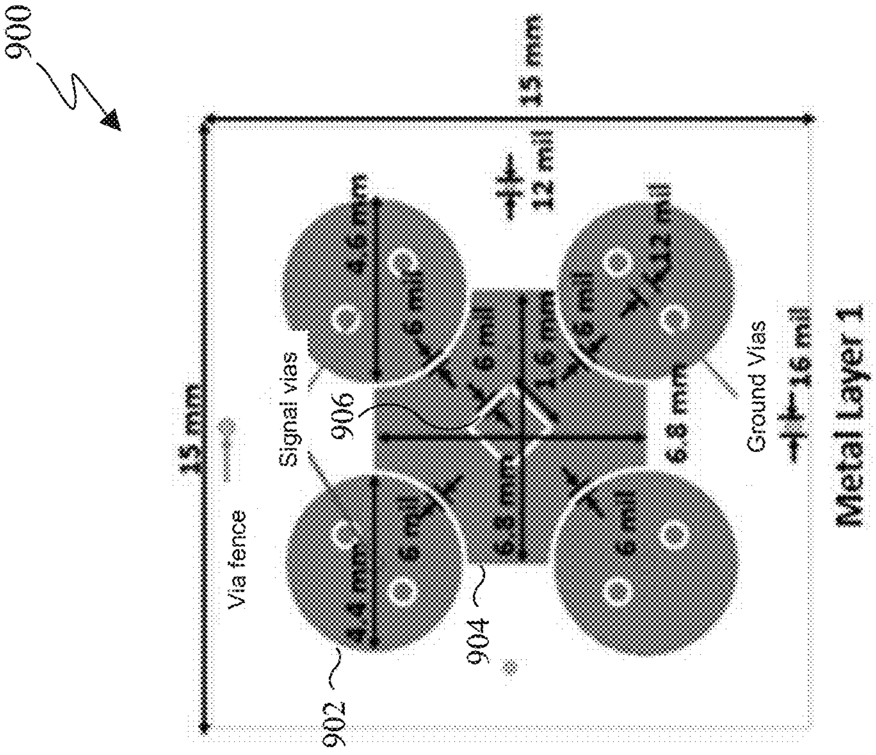
FIG. 9 illustrates an example antenna element in accordance with this disclosure.
Figure 11:
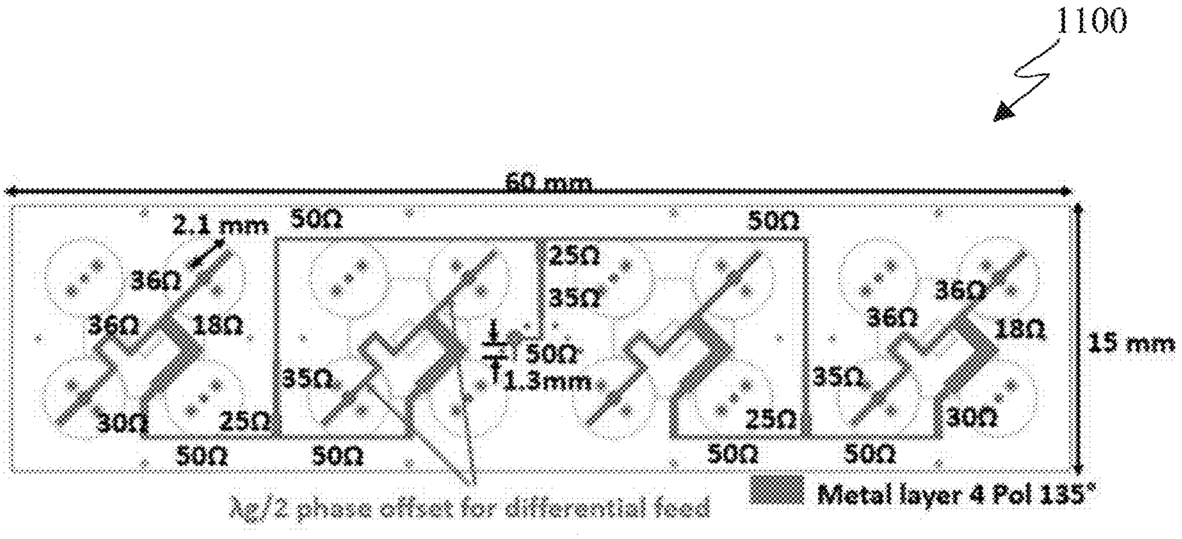
FIG. 11 illustrates an example differential feed and power divider for a 4×1 sub-array on layer 4 for an antenna module in accordance with this disclosure.
Figure 12:
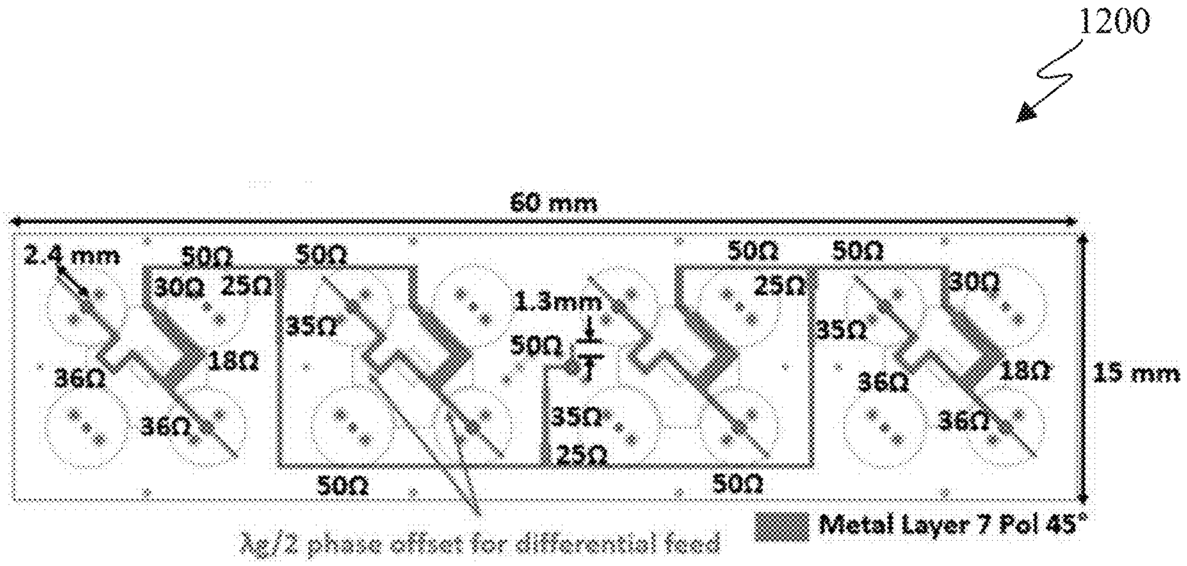
FIG. 12 illustrates an example differential feed and power divider for a 4×1 sub-array on layer 7 for an antenna module in accordance with this disclosure.
Figure 13:
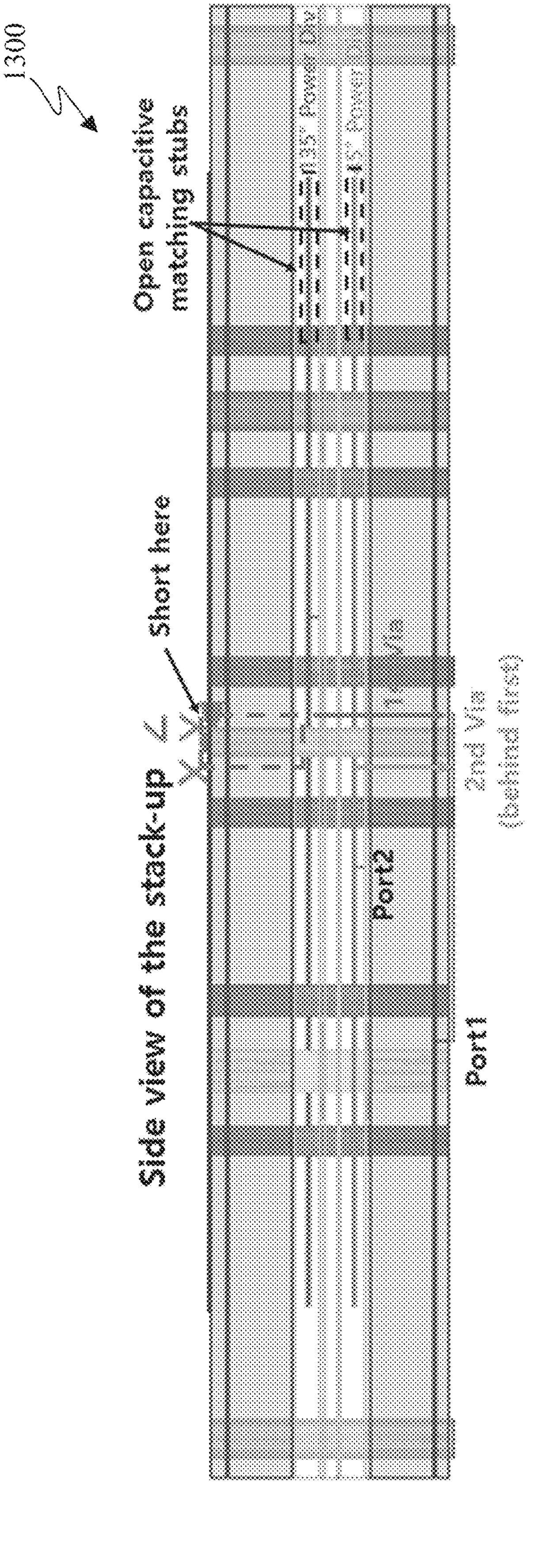
FIG. 13 illustrates an example through via stub matching for an antenna module in accordance with this disclosure.
Figure 14:
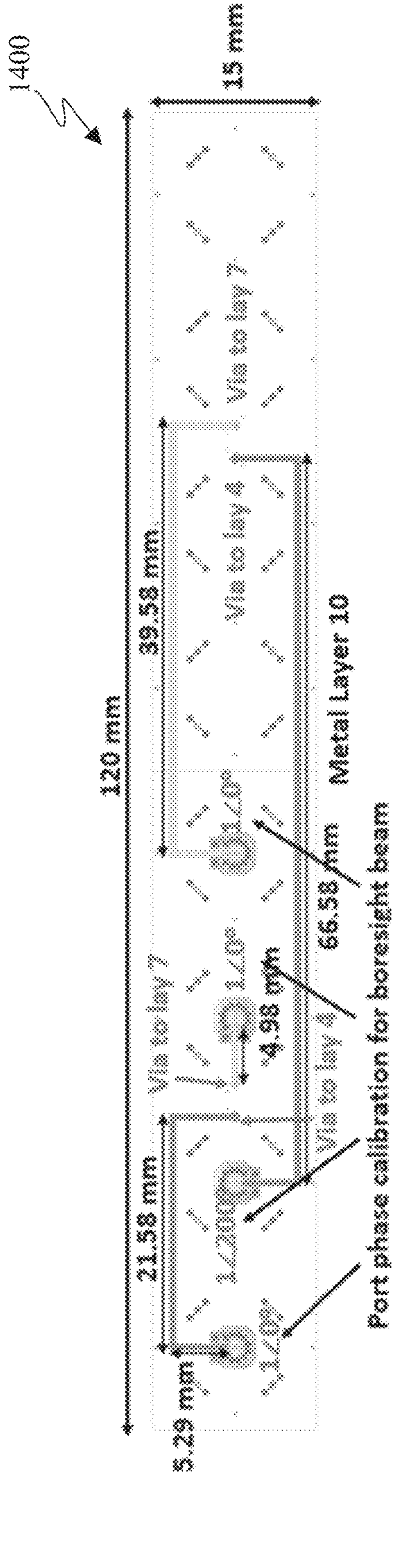
FIG. 14 illustrates an example routing from radio frequency port to power divider on layer 10 for an antenna module in accordance with this disclosure.

FIGS. 9-14 illustrate an example antenna element in accordance with this disclosure. In particular, FIG. 9 illustrates an example antenna element 900; FIG. 10 illustrates an example second layer 1000 of an antenna element; FIG. 11 illustrates an example differential feed and power divider 1100 for a 4×1 sub-array on layer 4 for an antenna module; FIG. 12 illustrates an example an example differential feed and power divider 1200 for a 4×1 sub-array on layer 7 for an antenna module; FIG. 13 illustrates an example through via stub matching 1300 for an antenna module in accordance with this disclosure; and FIG. 14 illustrates an example routing 1400 from radio frequency port to power divider on metal layer 10 for an antenna module in accordance with this disclosure. The embodiment of the example antenna element illustrated in FIGS. 9-14 is for illustration only. FIGS. 9-14 do not limit the scope of this disclosure to any particular implementation of an electronic device.

FIG. 9 shows the design for example antenna element 900. The example antenna element 900 can include four circular feed patches 902 around a central patch 904. The central patch 904 can be shaped in a rectangle. The central patch 904 can have a width and length that are approximately 6.8 mm.

The central patch 904 can include a diamond shaped slot 906. The diamond shaped slot 906 can be positioned in the center of the central patch 904 can support the 45° polarization and 135° polarization, which enhances the bandwidth by introducing an additional resonance. The central patch 904 can have a width and length of approximately 1.6 mm and a thickness of approximately 6 mil.

The circular feed patches 902 can be arranged around the central patch 904 to support the 45° polarization and 135° polarization. In certain embodiments, the circular feed patches 902 can be arranged at each corner of a central patch 904 that is in the shape of a square. The circular feed patches 902 can have a diameter that is approximately 4.4 mm. In certain embodiments, a first pair of the circular feed patches can be associate with an inclusive range of 0.15 to 0.2 of a free-space wavelength. The circular feed patches 902 can couple to the central patch 904 in an inclusive range of 0.25 to 0.3 of a free-space wavelength with a gap in an inclusive range of 0.01 to 0.02 of a free-space wavelength.

The circular feed patches 902 can be isolated from the central patch 904 to achieve a desired mutual coupling, such as a mutual coupling of less than-20 dB. A gap can be provided between the circular feed patches 902 and the central patch 904. The gap can be approximately 6 mil. The signal vias can be positioned inside of the different circular feed patches.

As shown in FIG. 10, a metal frame 1002 can be positioned on metal layer 2 of FIG. 8, which does not affect antenna performance and is only used to balance the ground on metal layer 9 and maintain symmetry. The metal frame 1002 can have a width and length of approximately 15 mm. The top and bottom thickness of the metal frame 1002 can be approximately 1 mm. The side thicknesses of the metal frame 1002 can be approximately 0.3 mm.

As shown in FIGS. 11 and 12, metal layer 4 can include a feedline for 135° polarization and metal layer 7 can include a feedline for 45° polarization. The feedlines for the 4×1 sub-array can be implemented in a stripline configuration. For brevity, only impedances of each segment are mentioned.

Through vias are used in the antenna module stack-up 800, which avoids high fabrication costs associated with blind vias. An exception of using blind vias is for grounding the sub-miniature push-on micro (SMPM) connector from metal layers 9 to 10, shown in FIG. 8. A novel approach implemented here is to short the signal in the through vias with adjacent ground vias at top or bottom metal layer to avoid radiation loss from the through vias. This approach causes the additional length of vias extending above and below the feedlines on metal layers 4 and 7 to have an inductive reactance. Hence the feedlines are matched using open circuit capacitive stubs.

The 4×1 sub-array from metal layers 1-9 with the power divider can be replicated twice to form the 8×1 sub-array. Routing from power divider common port to the RF port of stingray on metal layer 10 is different for each element of the 8×1 sub-array due to stingray board RFIC port placement (FIG. 1). The routing and associated line lengths for each RF to power divider port of the 8×1 sub-array. The 8×1 sub-array can be replicated 8 times to form the 8×8 antenna module.

Although FIGS. 9-14 illustrate an example antenna element 900, various changes may be made to FIGS. 9-14. For example, the sizes, shapes, and dimensions of the example antenna element 900 and its individual components can vary as needed or desired. In addition, the example antenna element 900 may be used in any other suitable communication process and is not limited to the specific processes described above.

Figure 15:
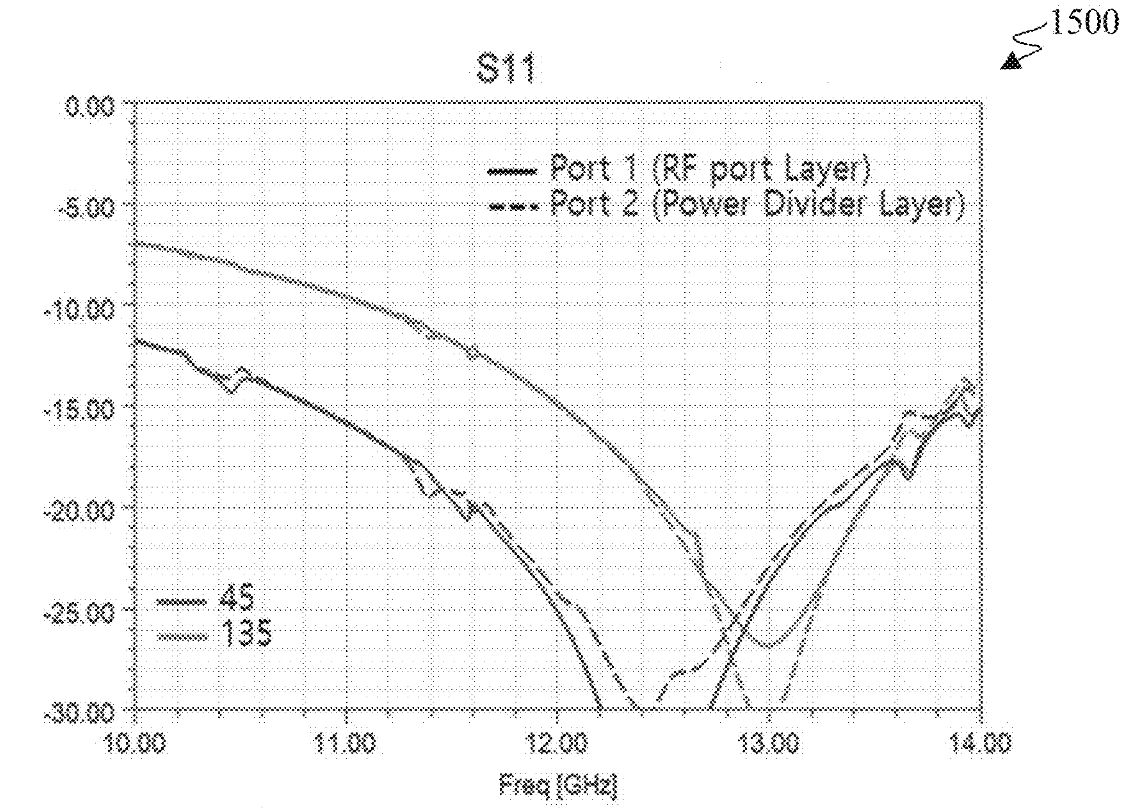
FIG. 15 illustrates an example parameter results for a reflection coefficient for the antenna module in accordance with this disclosure.
Figure 16:
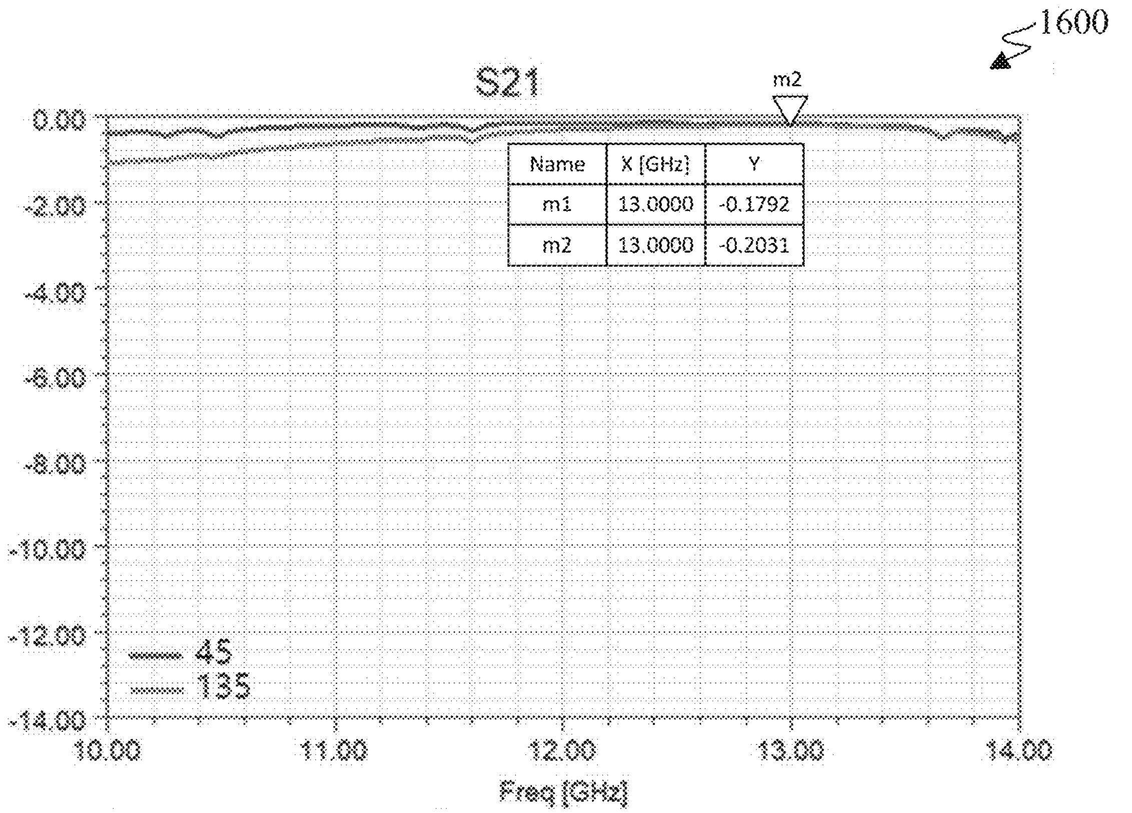
FIG. 16 illustrates an example parameter results for a transmission coefficient for the antenna module in accordance with this disclosure.

FIGS. 15 and 16 illustrate example operating parameters for the antenna array in accordance with this disclosure. In particular, FIG. 15 illustrates an example parameter results 1500 for a reflection coefficient for the antenna module; and FIG. 16 illustrates an example parameter results 1600 for a transmission coefficient for the antenna module. The embodiment of the example operating parameters illustrated in FIGS. 15 and 16 is for illustration only. FIGS. 15 and 16 do not limit the scope of this disclosure to any particular implementation of an electronic device.

As shown in FIGS. 15 and 16, the parameter results 1500 and 1600 are determined for the via design stub matching according to the port numbers. Port 1 is located on layer 10, which is the same layer where the RF port is located, port 2 is a power divider port on layer 4 or layer 7. Both port 1 and port 2 can be implemented as lumped ports, and the feedlines can be kept very short, so that only the via transition loss can be focused upon.

FIG. 15 shows the reflection coefficient ($S_{11}$) parameter results 1500. The solid lines indicate results for port 1 and the dashed lines for port 2. The lines starting at −7.00 indicates the results for 135° polarization. The lines starting at −12.00 indicates the results for 45° polarization. These results show that all ports are well matched with high bandwidth.

FIG. 16 shows the transmission coefficient ($S_{21}$) parameter results 1600. The lines starting at −1.20 indicates the results for 135° polarization. The lines starting at −0.40 indicates the results for 45° polarization. These results show that the insertion loss is as low as 0.17 dB, which is not reported before at this frequency of 13 GHz for vias of these lengths spanning multiple layers.

Figure 17A:
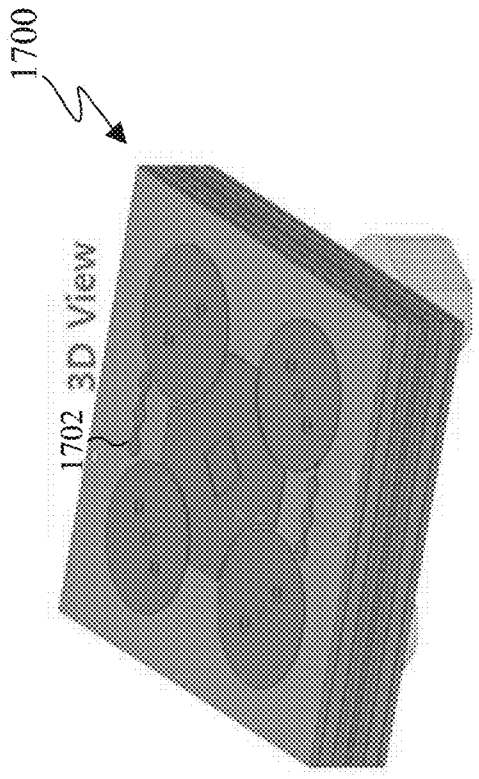
FIGS. 17A-17D illustrate an example antenna module in accordance with this disclosure.
Figure 17B:
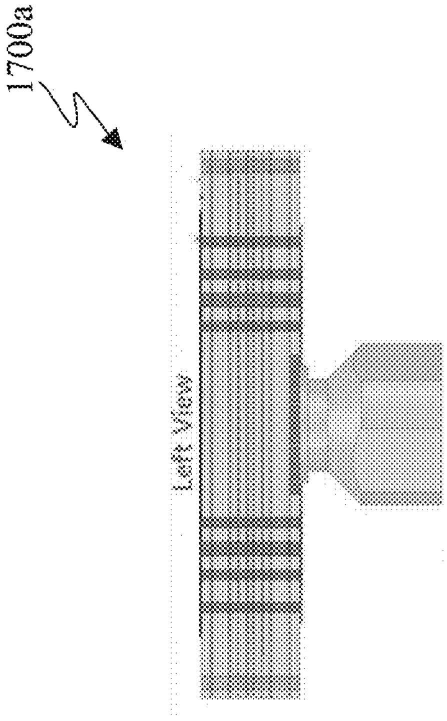
Figure 17C:
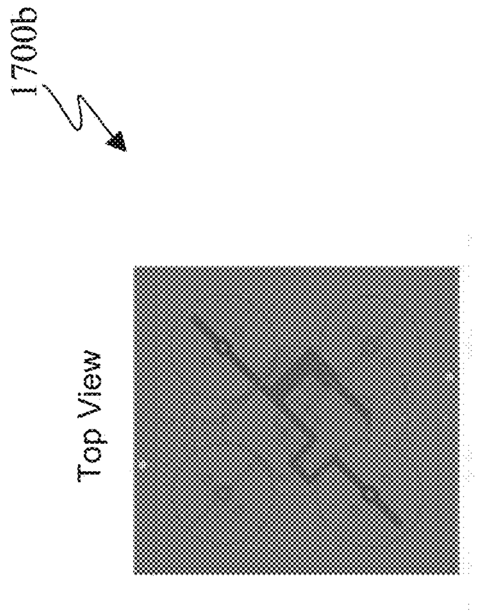
Figure 17D:
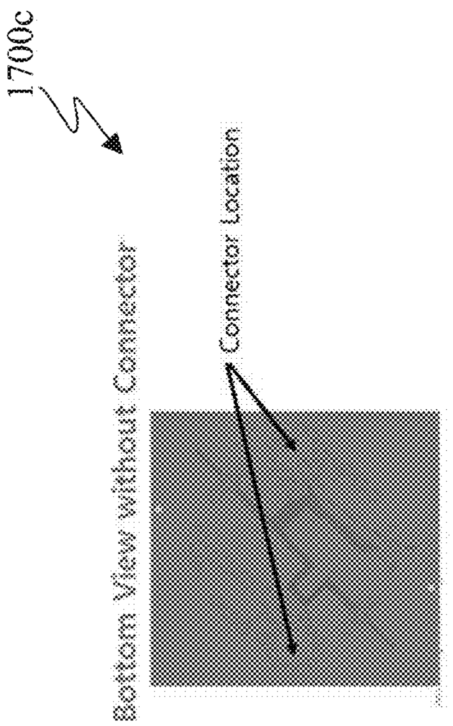

FIGS. 17A-17D illustrate an example antenna module 1700 in accordance with this disclosure. FIG. 17A shows an isometric view of the example antenna module 1700, FIG. 17B shows a side view 1700*a* of the example antenna module 1700, FIG. 17C shows a top view 1700*b* of the example antenna module 1700, and FIG. 17D shows a bottom view 1700*c* of the example antenna module 1700. The embodiment of the example antenna module 1700 illustrated in FIGS. 17A-17D is for illustration only. FIGS. 17A-17D do not limit the scope of this disclosure to any particular implementation of an electronic device.

As shown in FIGS. 17A-17D, the example antenna module 1700 can include two connectors 1702 placed on the bottom of the first layer. One connector 1702 can feed the 135° polarization and the other connector 1702 can feed the 45° polarization.

Although FIGS. 17A-17D illustrate an example antenna module 1700, various changes may be made to FIGS. 17A-17D. For example, the sizes, shapes, and dimensions of the example antenna module 1700 and its individual components can vary as needed or desired. In addition, the example antenna module 1700 may be used in any other suitable communication process and is not limited to the specific processes described above.

Figure 18A:
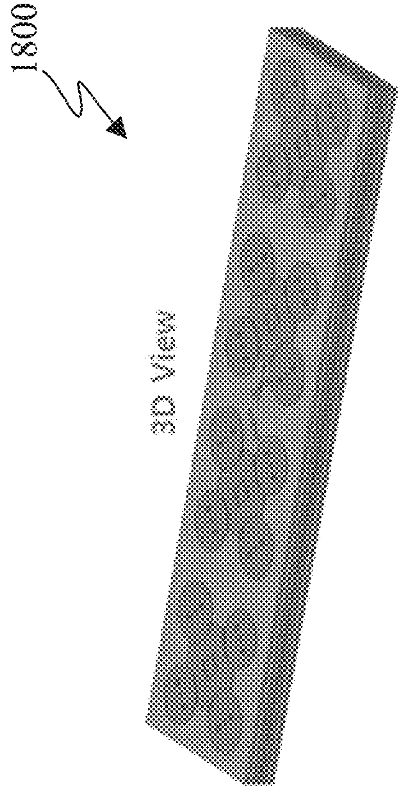
FIGS. 18A-18D illustrate an example antenna module in accordance with this disclosure.
Figure 18B:
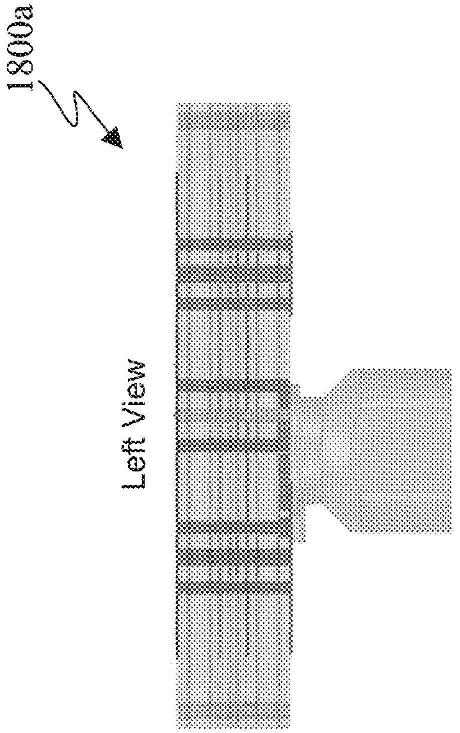
Figure 18C:
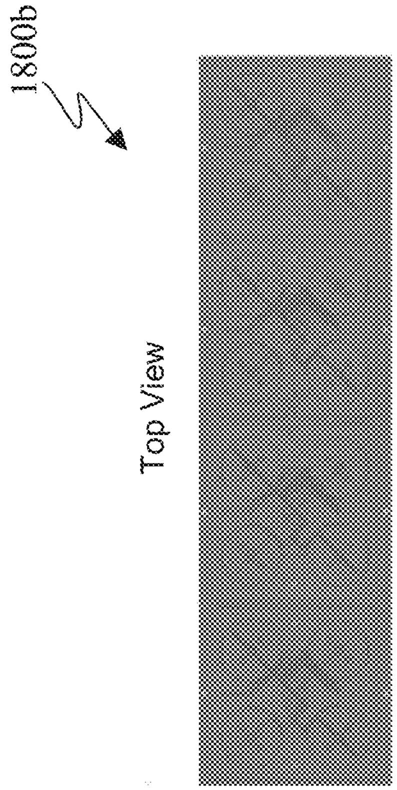
Figure 18D:
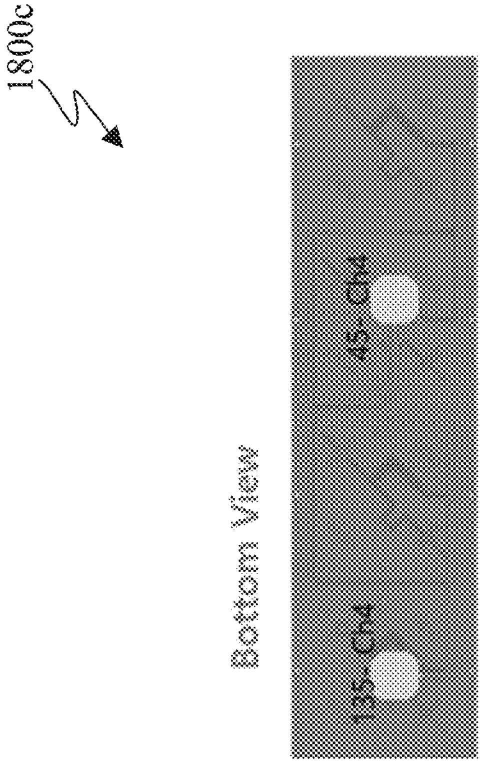

FIGS. 18A-18D illustrate an example antenna module 1800 in accordance with this disclosure. FIG. 18A shows an isometric view of the example antenna module 1800, FIG. 18B shows a side view 1800*a* of the example antenna module 1800, FIG. 18C shows a top view 1800*b* of the example antenna module 1800, and FIG. 18D shows a bottom view 1800*c* of the example antenna module 1800. The embodiment of the example antenna module 1800 illustrated in FIGS. 18A-18D is for illustration only. FIGS. 18A-18D do not limit the scope of this disclosure to any particular implementation of an electronic device.

As shown in FIGS. 18A-18D, a 4×1 sub-array can be made using the same stackup as shown in FIG. 8. The example antenna module 1800 has a circular center patch with a square shaped slot. The circular patches can be evenly arranged around the circular center patch. In certain embodiments, the circular patches are arranged at an edge of the circular center patch in alignment with one of the edges of the square shaped slot. Connector locations are such that they can easily interface with the evaluation board RF port in FIG. 7.

Although FIGS. 18A-18D illustrate an example antenna module 1800, various changes may be made to FIGS. 18A-18D. For example, the sizes, shapes, and dimensions of the example antenna module 1800 and its individual components can vary as needed or desired. In addition, the example antenna module 1800 may be used in any other suitable communication process and is not limited to the specific processes described above.

Figure 19A:
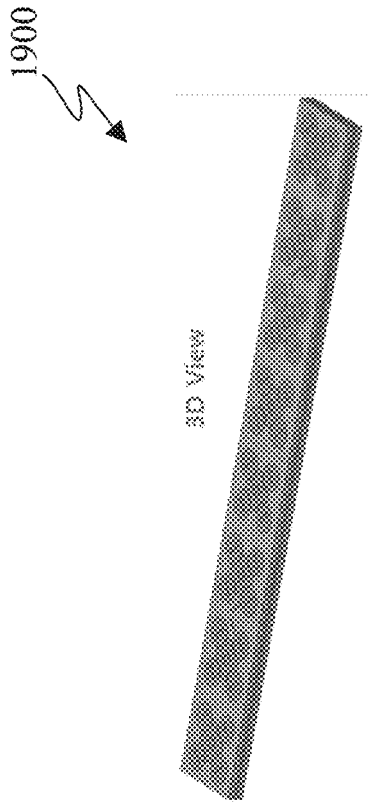
FIGS. 19A-19D illustrate an example antenna module in accordance with this disclosure.
Figure 19B:
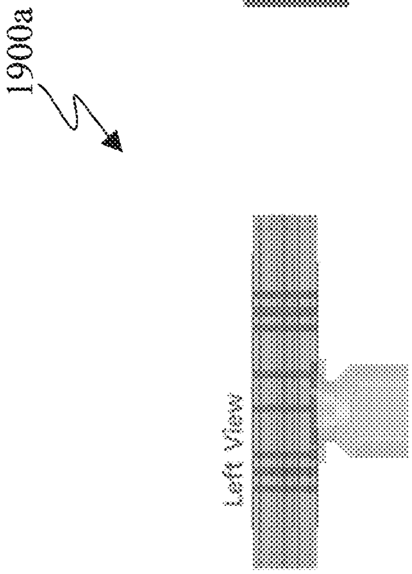
Figure 19C:
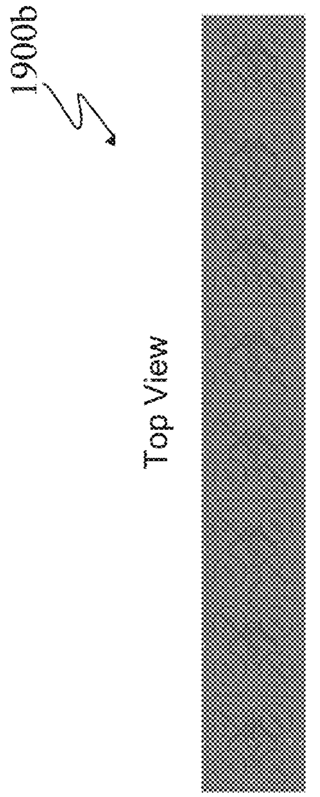
Figure 19D:
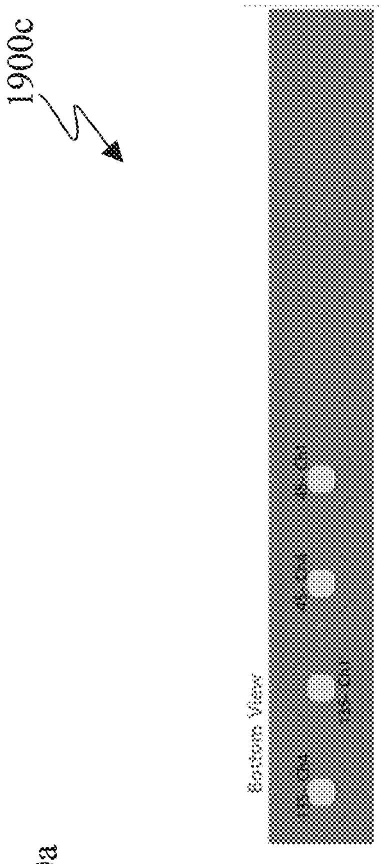

FIGS. 19A-19D illustrate an example antenna module 1900 in accordance with this disclosure. FIG. 19A shows an isometric view of the example antenna module 1900, FIG. 19B shows a side view 1900*a* of the example antenna module 1900, FIG. 19C shows a top view 1900*b* of the example antenna module 1900, and FIG. 19D shows a bottom view 1900*c* of the example antenna module 1900. The embodiment of the example antenna module 1900 illustrated in FIGS. 19A-19D is for illustration only. FIGS. 19A-19D do not limit the scope of this disclosure to any particular implementation of an electronic device.

As shown in FIGS. 19A-19D, the example antenna module 1900 is arranged in an 8×1 sub-array. The 4×1 sub-array from layers 1-9 is replicated to form the 8×1 sub-array. The routing on layer 10 is different for the second port of the second 4×1 sub-array because of the asymmetrical RF port arrangement of the ports on the top half of the evaluation board. The 8×1 sub-array is the smallest overall building block for an 8×8 antenna module. The 8×1 sub-array block can be replicated eight times to form the 8×8 module.

Although FIGS. 19A-19D illustrate an example antenna module 1900, various changes may be made to FIGS. 19A-19D. For example, the sizes, shapes, and dimensions of the example antenna module 1900 and its individual components can vary as needed or desired. In addition, the example antenna module 1900 may be used in any other suitable communication process and is not limited to the specific processes described above.

Figure 20A:
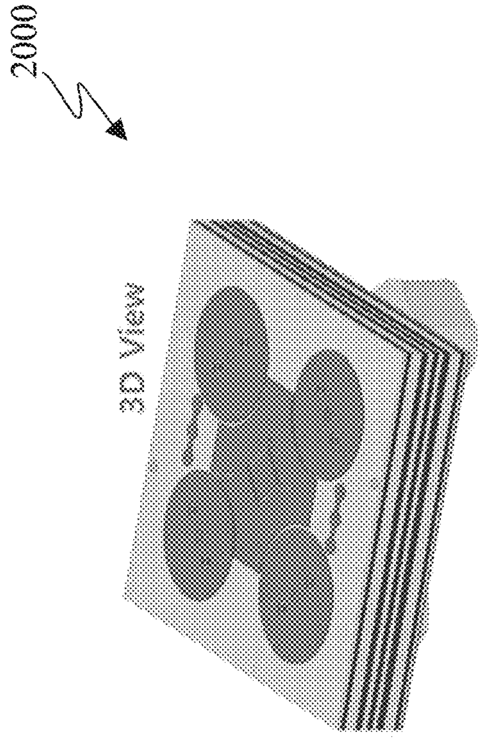
FIGS. 20A-20D illustrate an example antenna module in accordance with this disclosure.
Figure 20B:
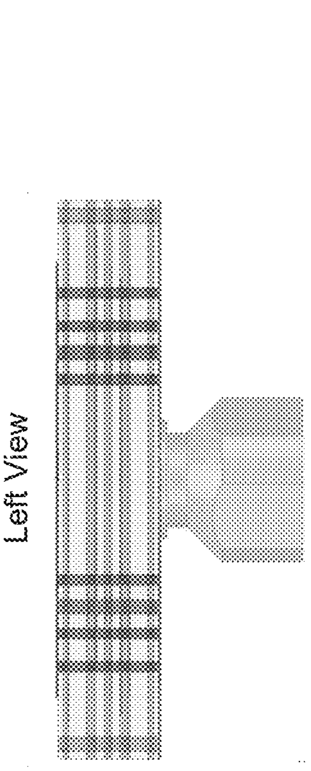
Figure 20C:
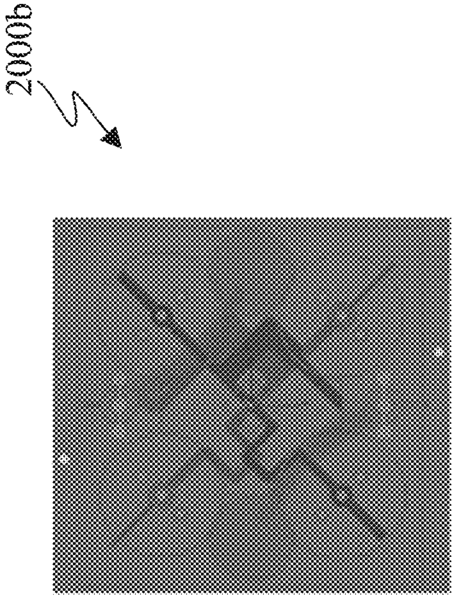
Figure 20D:
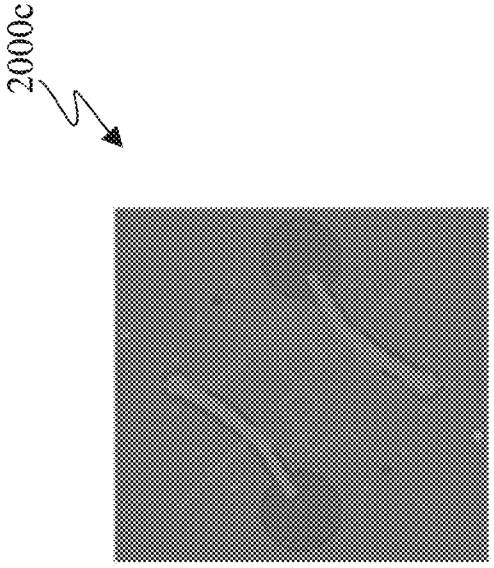

FIGS. 20A-20D illustrate an example antenna module 2000 in accordance with this disclosure. FIG. 20A shows an isometric view of the example antenna module 2000, FIG. 20B shows a side view 2000*a* of the example antenna module 2000, FIG. 20C shows a top view 2000*b* of the example antenna module 2000, and FIG. 20D shows a bottom view 2000*c* of the example antenna module 2000. The embodiment of the example antenna module 2000 illustrated in FIGS. 20A-20D is for illustration only. FIGS. 20A-20D do not limit the scope of this disclosure to any particular implementation of an electronic device.

As shown in FIGS. 20A-20D, the example antenna module 2000 includes routing on the bottom layer that can be changed from microstrip to a coplanar waveguide (CPW). The inclusion of the CPW can help to establish a ground plane on the bottom layer (e.g., layer 10 shown in FIG. 8), and eliminate the need for blind vias. No blind vias can further reduce production cost.

Although FIGS. 20A-20D illustrate an example antenna module 2000, various changes may be made to FIGS. 20A-20D. For example, the sizes, shapes, and dimensions of the example antenna module 2000 and its individual components can vary as needed or desired. In addition, the example antenna module 2000 may be used in any other suitable communication process and is not limited to the specific processes described above.

Figure 21:
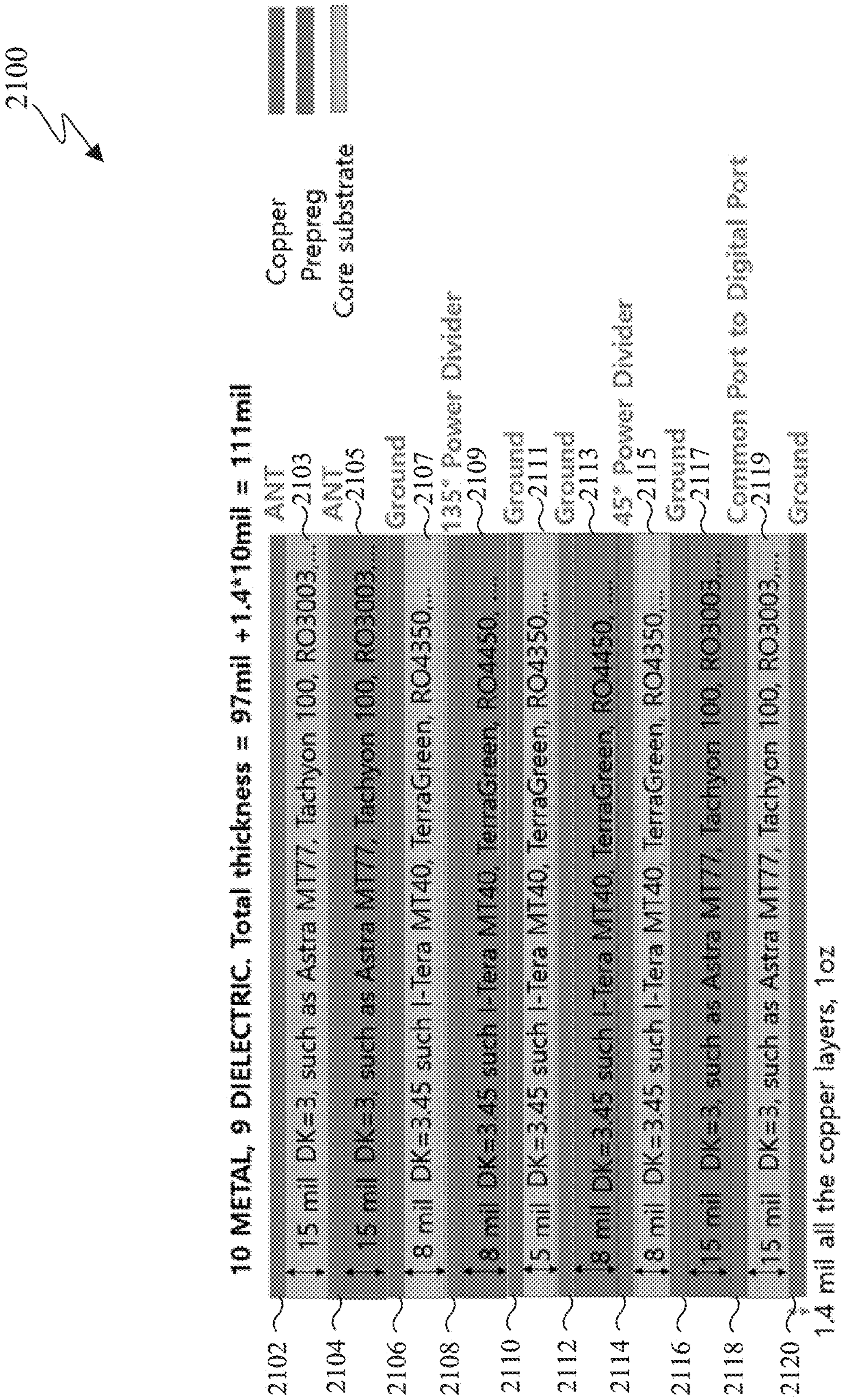
FIG. 21 illustrates an example antenna module in accordance with this disclosure.

FIG. 21 illustrates an example antenna module 2100 in accordance with this disclosure. The embodiment of the example antenna module 2100 illustrated in FIG. 21 is for illustration only. FIG. 21 does not limit the scope of this disclosure to any particular implementation of an electronic device.

As shown in FIG. 21, the example antenna module 2100 can include feedline implemented in a stripline configuration on metal layer 9 instead of using a microstrip or CPW line on the bottom layer. With the stripline case, the stack-up is shown in FIG. 21. The SMPM connector can be changed to include a vertical pin that can interface with metal layer 9, as shown in FIG. 21.

In certain embodiments, the example antenna module 2100 can include ten metal layers and nine dielectric layers separating the ten metal layers. Each of the metal layers can have a thickness of approximately 1.4 mil and be made of 1 oz of copper. A first metal layer 2102 can function as an antenna layer. A first dielectric layer 2103 can separate the first metal layer 2102 from a second metal layer 2104. The first dielectric layer 2103 can have a thickness of approximately 15 mil and a relative permittivity of approximately 3.

The second metal layer 2104 can function as a frame. A second dielectric layer 2105 can separate the second metal layer 2104 from a third metal layer 2106. The second dielectric layer 2105 can have a thickness of approximately 15 mil and a relative permittivity of approximately 3.

The third metal layer 2106 can function as a ground. A third dielectric layer 2107 can separate the third metal layer 2106 from a fourth metal layer 2108. The third dielectric layer 2107 can have a thickness of approximately 8 mil and a relative permittivity of approximately 3.45.

The fourth metal layer 2108 can function as a 135° power divider. A fourth dielectric layer 2109 can separate the fourth metal layer 2108 from a fifth metal layer 2110. The fourth dielectric layer 2109 can have a thickness of approximately 8 mil and a relative permittivity of approximately 3.45.

The fifth metal layer 2110 can function as a ground. A fifth dielectric layer 2111 can separate the fifth metal layer 2110 from a sixth metal layer 2112. The fifth dielectric layer 2111 can have a thickness of approximately 8 mil and a relative permittivity of approximately 3.45.

The sixth metal layer 2112 can function as a ground. A sixth dielectric layer 2113 can separate the sixth metal layer 2112 from a seventh metal layer 2114. The sixth dielectric layer 2113 can have a thickness of approximately 8 mil and a relative permittivity of approximately 3.45.

The seventh metal layer 2114 can function as a 45° polarization power divider. A seventh dielectric layer 2115 can separate the seventh metal layer 2114 from an eighth metal layer 2116. The seventh dielectric layer 2115 can have a thickness of approximately 8 mil and a relative permittivity of approximately 3.45.

The eighth metal layer 2116 can function as a ground. An eighth dielectric layer 2117 can separate the eighth metal layer 2116 from a ninth metal layer 2118. The eighth dielectric layer 2117 can have a thickness of approximately 15 mil and a relative permittivity of approximately 3.

The ninth metal layer 2118 can function as a common port to RF port. A ninth dielectric layer 2119 can separate the ninth metal layer 2118 from a tenth metal layer 2120. The ninth dielectric layer 2119 can have a thickness of approximately 15 mil and a relative permittivity of approximately 3. The tenth metal layer 2120 can function as a ground.

Although FIG. 21 illustrates an example antenna module 2100, various changes may be made to FIG. 21. For example, the sizes, shapes, and dimensions of the example antenna module 2100 and its individual components can vary as needed or desired. In addition, the example antenna module 2100 may be used in any other suitable communication process and is not limited to the specific processes described above.

Figure 22:
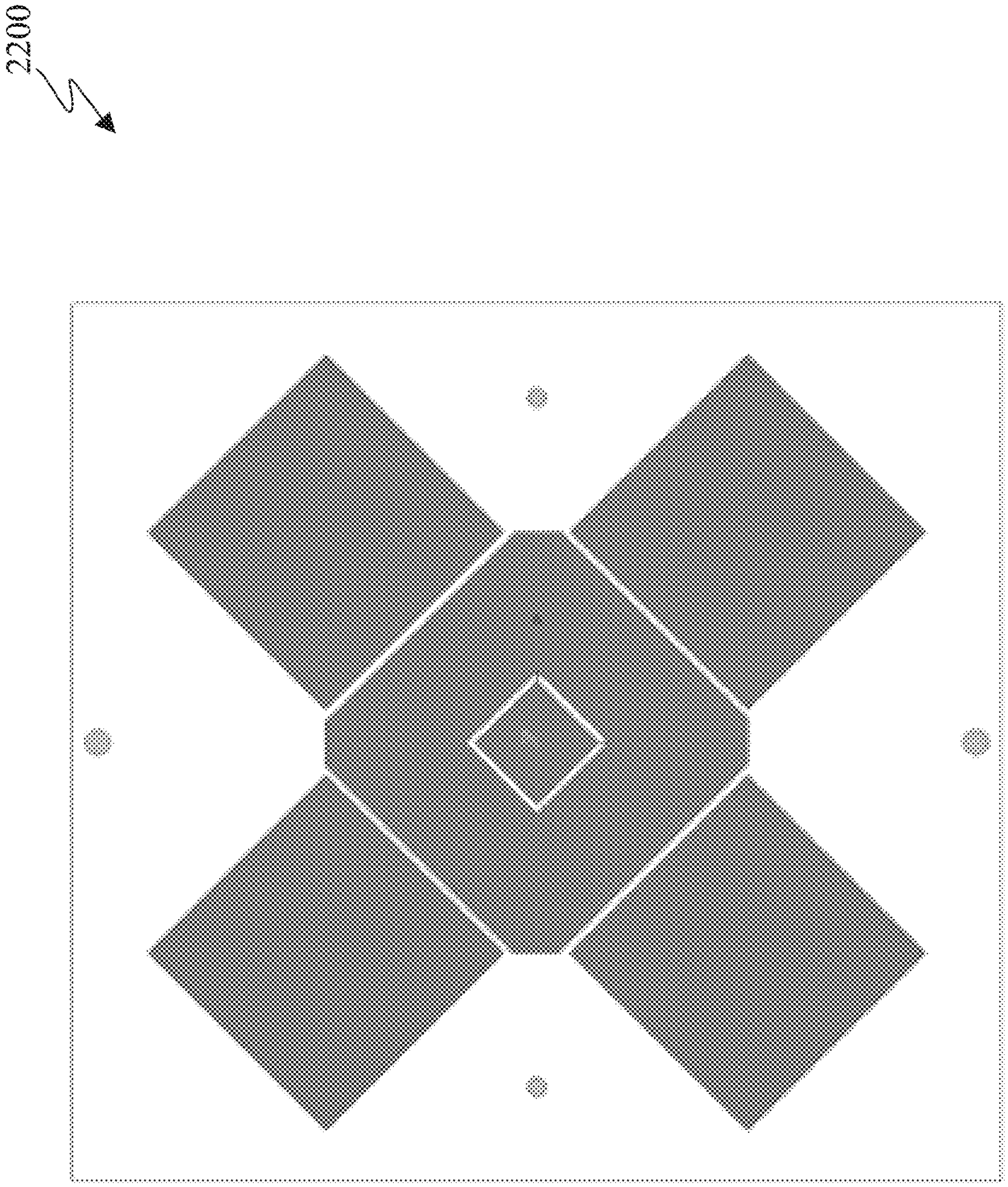
FIG. 22 illustrates an example antenna element in accordance with this disclosure.

FIG. 22 illustrates an example antenna element 2200 in accordance with this disclosure. The embodiment of the example antenna element 2200 illustrated in FIG. 22 is for illustration only. FIG. 22 does not limit the scope of this disclosure to any particular implementation of an electronic device.

As shown in FIG. 22, example antenna element 2200 can include rhombic patches that can be used instead of the circular feeding patches on metal layer 1 for the antenna element or sub-array. The rhombic patches can be oriented at edges of a square center patch. The square center patch can include a square slot that includes edges oriented with the edges of the square center patch.

Although FIG. 22 illustrates an example antenna element 2200, various changes may be made to FIG. 22. For example, the sizes, shapes, and dimensions of the example antenna element 2200 and its individual components can vary as needed or desired. In addition, the example antenna element 2200 may be used in any other suitable communication process and is not limited to the specific processes described above.

Figure 23:
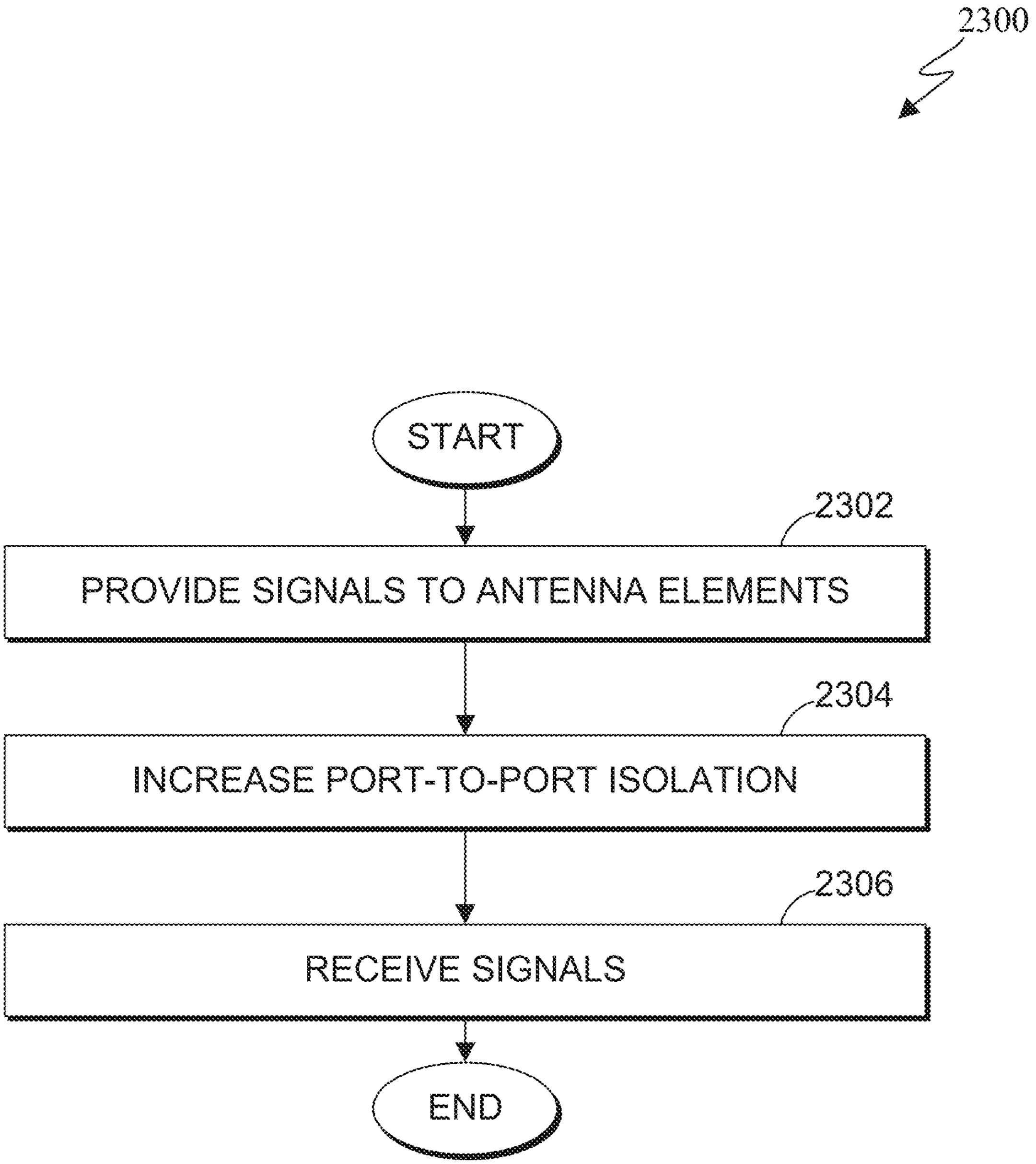
FIG. 23 illustrates an example method for dual polarized base station and UE antenna for 6G upper mid-band X-MIMO application according to this disclosure.

FIG. 23 illustrates an example method 2300 for dual polarized base station and UE antenna for 6G upper mid-band X-MIMO application according to this disclosure. For ease of explanation, the example method 2300 of FIG. 23 is described as being performed using the UE 116 of FIGS. 1 and 3 and the antenna array 402 of FIG. 4. However, the example method 2300 may be used with any other suitable system and any other suitable antenna array.

As shown in FIG. 23, The UE 116, which includes an example antenna array 402, can provide signals to a plurality of antenna elements at step 2302. The plurality of antenna elements can include a rectangular antenna patch, a first pair of circular antenna patches supporting a first angular polarization and a second pair of circular antenna patches supporting a second angular polarization that is orthogonal to the first angular polarization. The first pair of circular patches can be associated with an inclusive range of 0.15 to 0.2 of a free-space wavelength. The first pair of circular patches and the second pair of circular patches can couple to the rectangular antenna patch in an inclusive range of 0.25 to 0.3 of a free-space wavelength with a gap in an inclusive range of 0.01 to 0.02 of a free-space wavelength. The substrate can be a multi-layer substrate with a thickness in an inclusive range of 0.01 to 0.2 of a free-space wavelength. The substrate includes at least one of a transition layer, a ground layer, a 1×4 power divider layer of 135° polarization, a 1×4 power divider layer of 45° polarization, and an antenna layer. The rectangular frame associated with the second layer is in an inclusive range of 0.02 to 0.15 of a free-space wavelength. Port-to-port isolation of greater than 20 dB can be achieved based on a patch antenna feeding mechanism and the rectangular frame.

The port-to-port isolation can be increased for the antennas using an antenna configuration comprising the circular antenna patches of the first pair coupled to opposite corners of the rectangular antenna patch and the antenna patches of the second pair coupled to opposite corners of the rectangular antenna patch, wherein each of the antenna patches of the first pair are positioned on corners adjacent to both of the antenna patches of the second pair at step 2304. The first angular polarization can be a substantially 45° polarization and the second angular polarization can be a substantially 135° polarization.

The UE 116 can receive signals from the plurality of antenna elements at step 2306. The signals can be received from an external device separate from or related to the transmission signal.

Although FIG. 23 illustrates one example of a method 2300 for dual polarized base station and UE antenna for 6G upper mid-band X-MIMO application, various changes may be made to FIG. 23. For example, while shown as a series of steps, various steps in FIG. 23 may overlap, occur in parallel, or occur any number of times.

Although the present disclosure has been described with exemplary embodiments, various changes and modifications may be suggested to one skilled in the art. It is intended that the present disclosure encompass such changes and modifications as falling within the scope of the appended claims. None of the description in this application should be read as implying that any particular element, step, or function is an essential element that must be included in the claims scope. The scope of patented subject matter is defined by the claims.

What is claimed is:

1. An apparatus comprising:

a substrate; and a plurality of antenna elements on the substrate and arranged according to an antenna configuration comprising:

a rectangular antenna patch, a first pair of circular antenna patches supporting a first angular polarization, wherein the circular antenna patches of the first pair are coupled to opposite corners of the rectangular antenna patch, and a second pair of circular antenna patches supporting a second angular polarization that is orthogonal to the first angular polarization, wherein the circular antenna patches of the second pair are coupled to opposite corners of the rectangular antenna patch, wherein each of the circular antenna patches of the first pair are positioned on corners adjacent to both of the circular antenna patches of the second pair.

2. The apparatus of claim 1, wherein:

the first angular polarization is a substantially 45-degree polarization, and the second angular polarization is a substantially 135-degree polarization.

3. The apparatus of claim 1, wherein the first pair of circular patches is associated with an inclusive range of 0.15 to 0.2 of a free-space wavelength.

4. The apparatus of claim 1, wherein the first pair of circular patches and the second pair of circular patches couple to the rectangular antenna patch in an inclusive range of 0.25 to 0.3 of a free-space wavelength with a gap in an inclusive range of 0.01 to 0.02 of a free-space wavelength.

5. The apparatus of claim 1, wherein the substrate is a multi-layer substrate with a thickness in an inclusive range of 0.01 to 0.2 of a free-space wavelength.

6. The apparatus of claim 5, wherein the substrate includes at least one of a transition layer, a ground layer, a 1×4 power divider layer of 135-degree polarization, a 1×4 power divider layer of 45-degree polarization, and an antenna layer.

7. The apparatus of claim 6, wherein:

a rectangular frame is associated with a second layer of the multi-layer substrate is in an inclusive range of 0.02 to 0.15 of a free-space wavelength, and achieving a port-to-port isolation of greater than 20 dB is based on a patch antenna feeding mechanism and the rectangular frame.

8. An electronic device comprising:

a multiple input multiple output (MIMO) antenna comprising:

a substrate;

a plurality of antenna elements on the substrate and arranged according to an antenna configuration comprising:

a rectangular antenna patch, a first pair of circular antenna patches supporting a first angular polarization, wherein the circular antenna patches of the first pair are coupled to opposite corners of the rectangular antenna patch, and a second pair of circular antenna patches supporting a second angular polarization that is orthogonal to the first angular polarization, wherein the circular antenna patches of the second pair are coupled to opposite corners of the rectangular antenna patch;

transit (TX) processing circuitry coupled to the plurality of antenna elements and configured to provide signals to the plurality of antenna elements; and receive (RX) processing circuitry coupled to the plurality of antenna elements and configured to receive signals from the plurality of antenna elements, wherein each of the circular antenna patches of the first pair are positioned on corners adjacent to both of the circular antenna patches of the second pair.

9. The electronic device of claim 8, wherein:

the first angular polarization is a substantially 45-degree polarization, and the second angular polarization is a substantially 135-degree polarization.

10. The electronic device of claim 8, wherein the first pair of circular patches is associated with an inclusive range of 0.15 to 0.2 of a free-space wavelength.

11. The electronic device of claim 8, wherein the first pair of circular patches and the second pair of circular patches couple to the rectangular antenna patch in an inclusive range of 0.25 to 0.3 of a free-space wavelength with a gap in an inclusive range of 0.01 to 0.02 of a free-space wavelength.

12. The electronic device of claim 8, wherein the substrate is a multi-layer substrate with a thickness in an inclusive range of 0.01 to 0.2 of a free-space wavelength.

13. The electronic device of claim 12, wherein the substrate includes at least one of a transition layer, a ground layer, a 1×4 power divider layer of 135-degree polarization, a 1×4 power divider layer of 45-degree polarization, and an antenna layer.

14. The electronic device of claim 13, wherein:

a rectangular frame is associated with a second layer of the multi-layer substrate is in an inclusive range of 0.02 to 0.15 of a free-space wavelength, and achieving a port-to-port isolation of greater than 20 dB is based on a patch antenna feeding mechanism and the rectangular frame.

15. A method of using a massive MIMO antenna comprising:

providing signals to a plurality of antenna elements on a substrate, the plurality of antenna elements including a rectangular antenna patch, a first pair of circular antenna patches supporting a first angular polarization, and a second pair of circular antenna patches supporting a second angular polarization that is orthogonal to the first angular polarization;

increasing port-to-port isolation for antennas elements in the plurality of antennas elements using an antenna configuration comprising the circular antenna patches of the first pair coupled to opposite corners of the rectangular antenna patch and the circular antenna patches of the second pair coupled to opposite corners of the rectangular antenna patch, wherein each of the circular antenna patches of the first pair are positioned on corners adjacent to both of the circular antenna patches of the second pair; and receiving signals from the plurality of antenna elements.

16. The method of claim 15, wherein:

the first angular polarization is a substantially 45-degree polarization, and the second angular polarization is a substantially 135-degree polarization.

17. The method of claim 15, wherein the first pair of circular patches is associated with an inclusive range of 0.15 to 0.2 of a free-space wavelength.

18. The method of claim 15, wherein the first pair of circular patches and the second pair of circular patches couple to the rectangular antenna patch in an inclusive range of 0.25 to 0.3 of a free-space wavelength with a gap in an inclusive range of 0.01 to 0.02 of a free-space wavelength.

19. The method of claim 15, wherein the substrate is a multi-layer substrate with a thickness in an inclusive range of 0.01 to 0.2 of a free-space wavelength.

20. The method of claim 19, wherein:

the substrate includes at least one of a transition layer, a ground layer, a 1×4 power divider layer of 135-degree polarization, a 1×4 power divider layer of 45-degree polarization, and an antenna layer, a rectangular frame associated with a second layer of the multi-layer substrate is in an inclusive range of 0.02 to 0.15 of a free-space wavelength, and achieving a port-to-port isolation of greater than 20 dB is based on a patch antenna feeding mechanism and the rectangular frame.

* * * * *